US012162736B2

(12) United States Patent
Liu et al.

(10) Patent No.: US 12,162,736 B2
(45) Date of Patent: Dec. 10, 2024

(54) SHELF MANAGEMENT METHOD AND SYSTEM, PICKUP AREA AND STOCK PICKUP SYSTEM

(71) Applicant: BEIJING GEEKPLUS TECHNOLOGY CO., LTD., Beijing (CN)

(72) Inventors: Kai Liu, Beijing (CN); Mengdi Wang, Beijing (CN)

(73) Assignee: BEIJING GEEKPLUS TECHNOLOGY CO., LTD., Beijing (CN)

( * ) Notice: Subject to any disclaimer, the term of this patent is extended or adjusted under 35 U.S.C. 154(b) by 975 days.

(21) Appl. No.: 16/972,003

(22) PCT Filed: Jun. 6, 2019

(86) PCT No.: PCT/CN2019/090424
§ 371 (c)(1),
(2) Date: Dec. 4, 2020

(87) PCT Pub. No.: WO2019/233484
PCT Pub. Date: Dec. 12, 2019

(65) Prior Publication Data
US 2021/0323800 A1    Oct. 21, 2021

(30) Foreign Application Priority Data

Jun. 6, 2018   (CN) .......................... 201810577628.6
Apr. 29, 2019  (CN) .......................... 201910354343.0

(51) Int. Cl.
*B66F 9/06*   (2006.01)
*B65G 1/04*   (2006.01)
*G06Q 10/087* (2023.01)

(52) U.S. Cl.
CPC ............ *B66F 9/063* (2013.01); *B65G 1/0485* (2013.01); *G06Q 10/087* (2013.01); *B65G 1/0492* (2013.01)

(58) Field of Classification Search
CPC ..... B66F 9/063; B65G 1/0485; B65G 1/0492; G06Q 10/087
See application file for complete search history.

(56) References Cited

U.S. PATENT DOCUMENTS 8,965,562 B1 *   2/2015   Wurman ................ B25J 9/1602
                                           700/214
9,248,973 B1    2/2016   Brazeau
(Continued)

FOREIGN PATENT DOCUMENTS

CN    104364121 A    2/2015
CN    104555222 A    4/2015
(Continued)

*Primary Examiner* — Kyle O Logan
(74) *Attorney, Agent, or Firm* — Bayramoglu Law Offices LLC

(57) ABSTRACT

A shelf management method includes predicting whether there is space in the station queue area of a station; if yes, selecting a shelf from among the shelves allocated to the station and have not yet been transported, and controlling a moving robot to transport the selected shelf; after the moving robot is engaged with the selected shelf, re-predicting whether there is space in the station queue areas of all the stations that need the selected shelf; if yes, controlling the moving robot to transport the selected shelf to the station queue area that has been predicted to have space, and when the moving robot has transported the selected shelf to the pre-set area around the station queue area that has been predicted to have space, determining whether there is newly available space in the station queue area; if yes, controlling the moving robot to enter the station queue area.

17 Claims, 14 Drawing Sheets

(56) References Cited

U.S. PATENT DOCUMENTS

| | | | |
|---|---|---|---|
| 2007/0017984 A1* | 1/2007 | Mountz | G06Q 10/087 235/385 |
| 2007/0021863 A1* | 1/2007 | Mountz | G06Q 10/087 700/214 |
| 2007/0021864 A1* | 1/2007 | Mountz | G06Q 10/087 700/216 |
| 2009/0155884 A1 | 6/2009 | Federspiel et al. | |
| 2009/0185884 A1 | 7/2009 | Wurman et al. | |
| 2011/0301801 A1 | 12/2011 | Hiekel | |
| 2013/0302132 A1* | 11/2013 | D'Andrea | G05D 1/0274 414/807 |
| 2015/0117995 A1 | 4/2015 | D'Andrea | |
| 2016/0246301 A1 | 8/2016 | Kazama et al. | |
| 2018/0043533 A1 | 2/2018 | Johnson et al. | |

FOREIGN PATENT DOCUMENTS

| | | |
|---|---|---|
| CN | 105404250 A | 3/2016 |
| CN | 106061869 A | 10/2016 |
| CN | 106843238 A | 6/2017 |
| CN | 107235276 A | 10/2017 |
| CN | 108100548 A | 6/2018 |
| CN | 108945920 A | 12/2018 |
| CN | 109359924 A | 2/2019 |
| EP | 0407703 A1 | 1/1991 |
| EP | 3453493 A2 | 3/2019 |
| JP | H06171723 A | 6/1994 |
| JP | 2009513457 A | 4/2009 |
| JP | 2009541175 A | 11/2009 |
| JP | 2015522493 A | 8/2015 |
| JP | 201655963 A | 4/2016 |
| JP | 2018043832 A | 3/2018 |

\* cited by examiner

SHELF MANAGEMENT METHOD AND SYSTEM, PICKUP AREA AND STOCK PICKUP SYSTEM

CROSS REFERENCES TO THE RELATED APPLICATIONS

This application is a US national stage of International Application No. PCT/CN2019/090424, filed on Jun. 6, 2019, claiming the priority of Chinese Patent Application No. 201810577628.6 filed on Jun. 6, 2018 and Chinese Patent Application No. 201910354343.0 filed on Apr. 29, 2019, which are hereby incorporated by reference in their entireties.

TECHNICAL FIELD

The present application relates to the field of logistics automation, for example, to a shelf management method and system, a sorting zone and a stock sorting system.

BACKGROUND

With the vigorous development of logistics automation technology, robot-based goods-to-person systems have been widely used in the warehousing industry in western developed countries due to their flexibility and low cost. In traditional warehouse operations, shelves are fixed, and operating persons need to walk to designated goods locations to perform operations. The robot-based goods-to-person system differs from the traditional operation mode in that a shelf is transported by a mobile robot to a station and queued, and an operating person performs an operation in the station without walking. The robot-based goods-to-person mode greatly improves the efficiency of human operations.

In the robot-based goods-to-person system, goods can be placed on multiple sides of the mobile shelf. For example, goods locations can be provided on the 4 sides of front, back, left and right, while manual operations can be performed only on one side at the same time. Therefore, the shelf needs to be rotated such that the operation side faces the operating person. Moreover, to improve the sorting efficiency, the station can accommodate multiple shelves, but the operating person can only operate one shelf at the same time. Therefore, before the shelf is operated, the robot needs to carry the shelf, queue at the station and wait for the operating person's operation.

SUMMARY

A robot-based goods-to-person system is designed with a fixed queuing zone, uses a fixed side-turning zone to perform a side-turning operation on a shelf, and adopts a method of entering a side-turning zone through an arc. However, the number of robots that can be accommodated in the fixed queuing zone is limited, and the robots that cannot be accommodated stay on a passage and obstruct routes of other robots; a queuing route is relatively fixed, which is likely to cause a route deadlock; the side-turning zone is fixed, which is liable to become a bottleneck of efficiency, and when multiple mobile robots need a side-turning operation, the queuing robots wait for a release of the side-turning zone, so that the mobility becomes worse; and an arc path is used to enter the rotation zone, so that a large margin between the shelves is required, which is not conducive to improving the overall space utilization of a warehouse.

Therefore, the present application proposes a shelf management method and system to solve at least one of the foregoing problems, thereby improving the system sorting efficiency.

An aspect of the technical solution of the present application provides a shelf management method, including: estimating whether there is a free space in a station queuing zone of a station; selecting, in response to estimating that there is a free space in the station queuing zone, a shelf from shelves that are allocated to the station and not transported, and controlling a mobile robot to transport the selected shelf; after the mobile robot is butt-jointed with the selected shelf, re-estimating whether there is a free space in any of station queuing zones of all stations needing the selected shelf; in response to estimating that there is a free space in a station queuing zone of all the stations, controlling the mobile robot to transport the selected shelf to the station queuing zone estimated to have a free space, and determining, in a case where the mobile robot transports the selected shelf and arrives at a preset area around the station queuing zone estimated to have a free space, whether there is a free space vacated in the station queuing zone estimated to have a free space; and controlling, in response to determining that there is a free space vacated in the station queuing zone estimated to have a free space, the mobile robot to enter the station queuing zone estimated to have a free space.

In an embodiment, the method further includes: in response to estimating that there is no free space in any of the station queuing zones of all the stations, controlling the mobile robot to queue and wait in situ.

In an embodiment, the method further includes: in response to there being no free space vacated in the station queuing zone estimated to have a free space, controlling the mobile robot to queue and wait at a position, with a quantity of mobile robots less than a set quantity within a set range around the mobile robot, that does not obstruct routes of other mobile robots, or controlling the mobile robot to transport the selected shelf to another station needing the selected shelf.

In an embodiment, the method further includes: after controlling the mobile robot to enter the station queuing zone estimated to have a free space, determining in real time whether there is a free space vacated ahead of the mobile robot, and in response to determining that there is a free space vacated ahead of the mobile robot, controlling the mobile robot to move toward the free space ahead, or in response to there being no free space vacated ahead of the mobile robot, controlling the mobile robot to queue and wait in situ.

In an embodiment, estimating whether there is a free space in the station queuing zone of the station includes: in response to a number of mobile robots that are currently transporting shelves for a station being smaller than a size of a station queuing zone of the station, determining that the station queuing zone of the station has a free space; or in response to a number of mobile robots that are currently transporting shelves for a station being greater than or equal to a size of a station queuing zone of the station, calculating time for vacating a free space in the station queuing zone of the station, and in response to the time being less than time for a newly allocated mobile robot to arrive at the station queuing zone of the station, determining that the station queuing zone of the station has a free space.

In an embodiment, the method further includes: controlling the mobile robot to perform real-time detection on a surrounding environment of the selected shelf within a traveling route of the mobile robot transporting the selected shelf; and in response to detecting the surrounding environment of the selected shelf meeting a rotation condition, controlling the mobile robot to perform a rotation operation on the selected shelf.

In an embodiment, in response to detecting the surrounding environment of the selected shelf meeting the rotation condition, controlling the mobile robot to perform the rotation operation on the selected shelf includes: in response to detecting the surrounding environment of the selected shelf meeting the rotation condition, controlling the mobile robot to rotate the selected shelf in at least one of following three positions: performing rotation in a transporting route, performing rotation in a rotation zone of the station corresponding to the station queuing zone estimated to have a free space, or performing rotation in situ at an operation position of the station queuing zone estimated to have a free space.

In an embodiment, controlling the mobile robot to perform real-time detection on the surrounding environment of the selected shelf within the traveling route of the mobile robot transporting the selected shelf includes: within the traveling route of the mobile robot transporting the selected shelf, controlling the mobile robot to detect whether a cell within a preset range around a route point ahead is occupied, and in response to the cell within the preset range around the route point ahead being applied for successfully, using the route point ahead as a rotation point; and in a case where the mobile robot arrives at the set rotation point, occupying the cell within the preset range around the route point ahead as the rotation zone, and in response to the cell within the preset range around the route point ahead being not occupied successfully, controlling the mobile robot to continue walking.

In an embodiment, in response to detecting the surrounding environment of the selected shelf meeting a rotation condition, controlling the mobile robot to perform the rotation operation on the selected shelf includes: before the mobile robot arrives at the operation position of the station queuing zone estimated to have a free space, if the mobile robot does not rotate the selected shelf in the traveling route for transporting the selected shelf, controlling the mobile robot to enter the rotation zone of the station corresponding to the station queuing zone estimated to have a free space to rotate the selected shelf.

In an embodiment, the method further includes: in a case where the selected shelf that has been rotated still needs to be rotated, determining whether a cell within a preset range around the mobile robot in-situ being possible to be occupied, and in response to the cell within the preset range around the mobile robot in-situ being possible to be occupied, occupying the corresponding cell as the rotation zone, and in response to the cell within the preset range around the mobile robot in-situ being not possible to be occupied, controlling the mobile robot to enter the station queuing zone estimated to have a free space again and continue to queue and enter the rotation zone of the corresponding station.

In an embodiment, controlling the mobile robot to perform the rotation operation on the selected shelf includes: controlling the mobile robot to rotate the selected shelf by using a straightline and polyline path within the rotation zone.

Another aspect of the technical solution of the present application further provides a shelf management system, including: a mobile robot configured to transport a shelf; the shelf configured to be provided with locations for placing commodities and be transportable by the mobile robot; a shelf zone configured to store the shelf; a station and a station queuing zone, wherein the station is a worker operation position; and the station queuing zone is an area set near the worker operation position, where the mobile robot transporting the shelf queues and waits for a worker's operation; and a server communicatively connected with the mobile robot and configured to execute the aforementioned shelf management method.

In an embodiment, a layout mode of the station queuing zone includes one of: a dual-station symmetrical layout mode, a parallel layout mode, or a mode of queuing with no specific rotation zone.

In an embodiment, in a case where the layout mode of the station queuing zone includes the dual-station symmetrical layout mode, the station queuing zone includes two rotation zones and two queuing passages around the two rotation zones respectively, the two queuing passages being partially overlapped to form a passage area between the two rotation zones, each queuing passage being provided with an entrance position, an operation position, a plurality of rotation zone entry positions, a plurality of queuing return positions, and an exit position, wherein the operation position is a position where the mobile robot transporting the shelf waits for the worker's operation; the rotation zone entry position is a position allowing the mobile robot to enter the rotation zone from the queuing passage; the queuing return position is a position allowing the mobile robot to enter the queuing passage from the rotation zone; the entrance position is set in the passage area, the two queuing passages sharing one entrance position; and the rotation zone entry positions, the queuing return positions and the exit positions on the two queuing passages are symmetrically arranged on two sides of the passage area.

In an embodiment, in a case where the layout mode of the station queuing zone includes the parallel layout mode, the station queuing zone includes two rotation zones and two queuing passages around the two rotation zones respectively, each queuing passage being provided with an entrance position, an operation position, a plurality of rotation zone entry positions, a plurality of queuing return positions, and an exit position, the two queuing passages being arranged in parallel, wherein the operation position is a position where the mobile robot transporting the shelf waits for the worker's operation; the rotation zone entry position is a position allowing the mobile robot to enter the rotation zone from the queuing passage; and the queuing return position is a position allowing the mobile robot to enter the queuing passage from the rotation zone.

In an embodiment, in a case where the layout mode of the station queuing zone includes a mode of queuing with no specific rotation zone, the station queuing zone includes a queuing passage, and the queuing passage is used as a rotation zone, the queuing passage being provided with an operation position, an exit position, and a plurality of entrance positions, the plurality of entrance positions being located between the operation position and the exit position.

In an embodiment, a plurality of directions are set for the exit position, and in a case where the mobile robot needs to perform shelf rotation again after the operation is completed, the mobile robot is allowed to enter the station queuing zone again from the exit position, or leave the station queuing zone from the exit position and return to the station queuing zone via an external route.

In an embodiment, in a case where a layout mode of the station queuing zone includes a multi-operation point layout mode, the station queuing zone includes a plurality of operation positions, the plurality of operation positions being arranged in a line, and each operation position being used as an entrance position and an exit position, and the operation position being a position where the mobile robot transporting the shelf waits for the worker's operation.

In an embodiment, the mobile robot is a wheel-driven trolley and is provided with a jacking mechanism, the jacking mechanism being configured to lift the shelf.

In an embodiment, the jacking mechanism and a trolley body move independently to achieve that the trolley body does not move, while the jacking mechanism performs descending and jacking operations; the trolley body does not move, while the jacking mechanism rotates; the trolley body and the jacking mechanism are locked up and rotate at a same speed; or the trolley body and the jacking mechanism rotate at different speeds at the same time.

In addition, in an automatic stock sorting system using robots, a goods-to-person mode is relatively common. The goods-to-person mode is based on an intelligent sorting robot. The robot automatically travels directly under a target pallet/target stock container according to order needs and stock information, and lifts the target pallet/target stock container and conveys the same to a sorting point, sorting point being provided with a display device such as a display screen; the display device prompts location information of goods required in a goods allocation order; a sorting person takes the required goods and puts the goods into a designated container as prompted to accomplish a sorting task; and after the sorting task is completed, the robot conveys the pallet/stock container back to a designated position.

Throughout the process in the aforementioned goods-to-person solution, a person does not need to walk, so that the sorting efficiency is greatly improved, and the labor intensity of persons is reduced. However, the aforementioned goods-to-person robot solution usually adopts a method of one sorting point corresponding to one sorting person, and there may be idle time for a person to wait for a robot, which is not conducive to improving the sorting efficiency.

The present application further provides a sorting zone, by means of which the queuing and waiting time of a sorting robot in the sorting zone is reduced to improve the sorting efficiency.

The present application further provides a stock sorting system, by means of which the queuing and waiting time of a sorting robot is reduced to improve the sorting efficiency.

The present invention adopts the following technical solution.

A sorting zone, includes one or more sorting stations, each sorting station including two sorting passages and two sorting points respectively located on the two sorting passages, wherein each sorting point is configured for a sorting operator to sort target goods; each sorting passage is configured to provide a traveling route for a sorting robot to enter the sorting station and pass through the sorting point on the sorting passage in the sorting station and leave the sorting station.

As an optional solution of the sorting zone, the two sorting passages are respectively U-shaped and are arranged side by side or in parallel, and the two sorting points are respectively located at the bottoms of the U shapes of the two sorting passages, and a sorting work zone for a sorting operator to move is formed at an end of the two sorting passages away from the openings of the U shapes.

In an embodiment, the two sorting passages are arranged adjacent to each other.

In an embodiment, the two sorting points are arranged adjacent to each other.

In an embodiment, the sorting work zone is provided with two put walls opposite to each other, each put wall accommodating a plurality of order containers, and the two sorting points are located in an extension space formed by the two put walls.

In an embodiment, the two sorting passages in each sorting station are respectively U-shaped and are spaced apart from each other; the two sorting points are respectively located on lateral sides of the U shapes of the two sorting passages and are arranged oppositely, and a sorting work zone for a sorting operator to move is formed between the two sorting passages.

In an embodiment, the two sorting passages are directly opposite and spaced apart.

In an embodiment, the two sorting points are directly opposite and spaced apart.

In an embodiment, one sorting passage of the two sorting passages provides a traveling route in a clockwise direction, and the other sorting passage provides a traveling route in a counterclockwise direction.

In an embodiment, each sorting passage has an entrance grid forming an entrance of the sorting passage and an exit grid forming an exit of the sorting passage, and a traveling width of the entrance grid and the exit grid is larger than a maximum outer diameter of a stock container.

In an embodiment, each sorting passage includes an entrance passage and an exit passage forming two lateral sides of the U shape; the exit passage is located on a side of the sorting passage adjacent to another sorting station; and the adjacent two sorting stations share the one exit passage.

In an embodiment, the sorting zone is logically provided with two-dimensional grids, wherein one two-dimensional grid corresponds to one of the sorting points.

In an embodiment, in each sorting passage, the two-dimensional grids located upstream of the sorting point on the sorting passage form an area for the sorting robot to pass and wait.

In an embodiment, at the center of at least one of the two-dimensional grids, a reference mark is provided for positioning by the sorting robot.

A stock sorting system, including: a stock container zone configured to store a plurality of stock containers; a sorting robot configured to transport the stock containers; and a sorting zone configured for a sorting operator to sort target goods from the stock container transported by the sorting robot, wherein: the sorting zone includes one or more sorting stations, each sorting station including two sorting passages and two sorting points respectively located on the two sorting passages, each sorting point is configured for the sorting operator to sort the target goods; each sorting passage is configured to provide a traveling route for the sorting robot to enter the sorting station and pass through the sorting point on each sorting passage in each sorting station and leave the sorting station.

In an embodiment, the two sorting passages are respectively U-shaped and are arranged side by side or in parallel, and the two sorting points are respectively located at bottoms of the U shapes of the two sorting passages, and a sorting work zone for a sorting operator to move is formed at an end of the two sorting passages away from the stock container zone.

In an embodiment, the two sorting passages are arranged adjacent to each other.

In an embodiment, the two sorting points are arranged adjacent to each other.

In an embodiment, the sorting work zone is provided with two put walls opposite to each other, each put wall accommodating a plurality of order containers, and the two sorting points are located between the two put walls.

In an embodiment, the two sorting passages in each sorting station are respectively U-shaped and are spaced apart from each other; the two sorting points are respectively located on lateral sides of the U shapes of the two sorting passages and are arranged oppositely, and a sorting work zone for a sorting operator to move is formed between the two sorting passages.

In an embodiment, a sorting face of the stock container located in the sorting zone is parallel to lateral sides of the U shape of each sorting passage.

In an embodiment, one sorting passage of the two sorting passages provides a traveling route in a clockwise direction, and the other sorting passage provides a traveling route in a counterclockwise direction.

In an embodiment, each sorting passage has an entrance grid forming an entrance of the sorting passage and an exit grid forming an exit of the sorting passage, and a traveling width of the entrance grid and the exit grid is larger than a maximum outer diameter of a stock container.

In an embodiment, each sorting passage includes an entrance passage and an exit passage forming two lateral sides of the U shape; the exit passage is located on a side of the sorting passage adjacent to another sorting station; and the adjacent two sorting stations share one exit passage.

In an embodiment, the stock container zone and the sorting zone are logically provided with two-dimensional grids, wherein one two-dimensional grid in the sorting zone corresponds to one of the sorting points.

In an embodiment, in each sorting passage, the two-dimensional grids located upstream of the sorting point on the sorting passage form an area for the sorting robot to pass and wait.

In an embodiment, a reference mark is provided at a center of at least one of the two-dimensional grids for positioning by the sorting robot.

Figure 1:
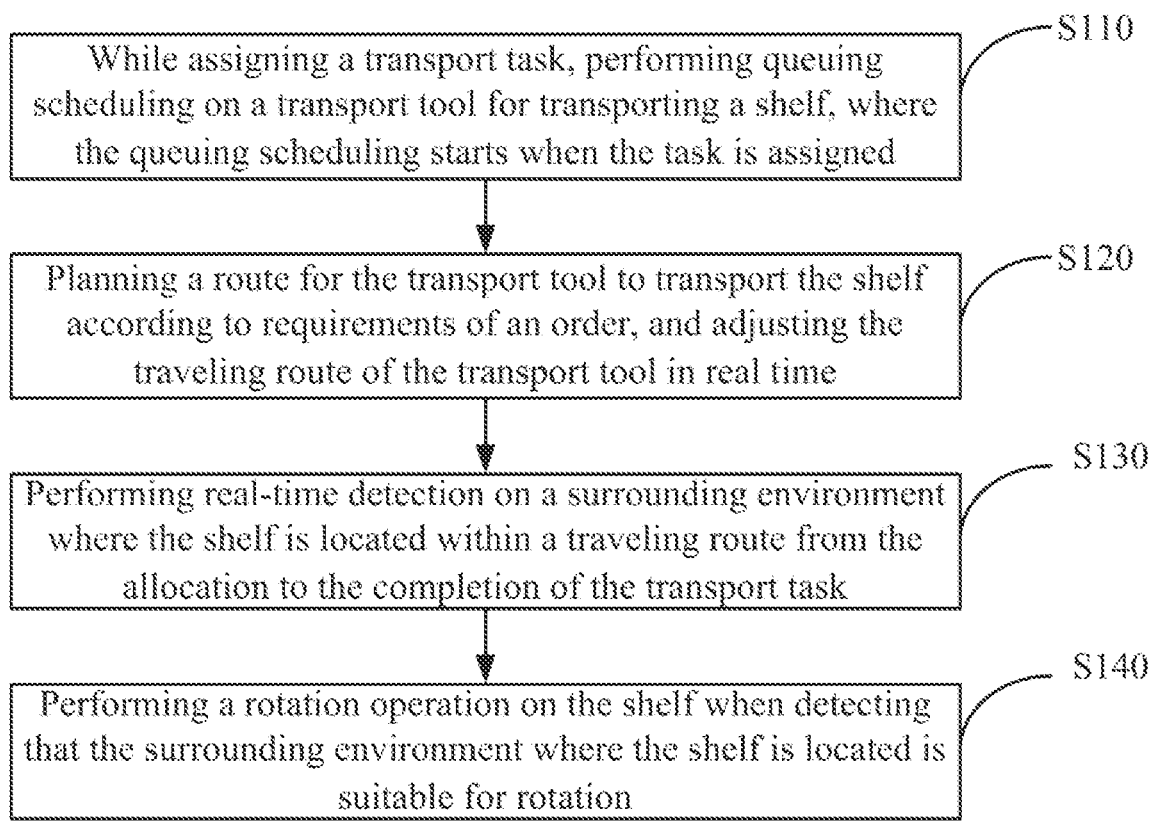
FIG. 1 is a flow diagram of a queuing and rotating method of a shelf in an embodiment of the present application.

Reference numerals are as follows.

10—sorting zone; 1—sorting station; 11—sorting work zone; 112—put wall; 12—sorting and waiting zone; 121—sorting passage; 1211—entrance passage; 1212—exit passage; 1213—direction changeover passage; 122—sorting point; 123—two-dimensional grid; 1231—entrance grid; 1232—exit grid;

20—stock container zone; 201—stock container group; 202—stock container; 2021—sorting face; 2022—partition layer; 2023—tag code; 2024—support column; 203—longitudinal passage; 204—transverse passage;

30—common passage;

40—sorting robot; 401—lifting mechanism; 402—driving mechanism; 403—scanning apparatus;

50—storage container.

DETAILED DESCRIPTION OF THE EMBODIMENTS

Passage: an area where a robot can walk when transporting a shelf.

Station queuing zone: an area set near a worker operation position, where a robot transporting a shelf queues and waits for a worker's operation.

Shelf: a square or rectangular shelf that can be transported by a mobile robot. A shelf can be divided into multiple layers, and each layer can be provided with locations in four directions (that is, four sides of the shelf).

As shown in FIG. 1, a shelf queuing and rotating method, including the following steps.

Step S110: while assigning a transport task, performing queuing scheduling on a transport tool for transporting a shelf, where the queuing scheduling starts when the task is assigned.

Step S120: planning a route for the transport tool to transport the shelf according to requirements of an order, and adjusting the traveling route of the transport tool in real time.

Step S130: performing real-time detection on a surrounding environment where the shelf is located within a traveling route from the allocation to the completion of the transport task.

Step S140: performing a rotation operation on the shelf when detecting that the surrounding environment where the shelf is located is suitable for rotation.

As an optional implementation, the transport tool is a mobile robot.

As an optional implementation, while assigning a transport task, performing queuing scheduling on a mobile robot includes: monitoring task time and quantity of a mobile robot in a station queuing zone in real time, and determining whether to allocate a new mobile robot for transporting a shelf to a station according to the task time and quantity of the mobile robot in the station queuing zone. If the task time and quantity of the mobile robot in the station queuing zone are under full load, a new mobile robot is not allocated, that is, allocation of a new transport task is suspended.

As an optional implementation, while assigning a transport task as described above, the method includes: performing preferential queue-jump scheduling on a shelf that has a high priority or does not need to be rotated. That is, for a mobile robot that does not need to perform a side-turning operation on a shelf, or a mobile robot with a high priority, a nearest route can be directly planned to insert it into a cell closest to an operation position, while a robot with a low priority waits.

Figure 4:
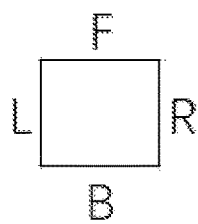
FIG. 4 is a schematic structural diagram of a top view of a shelf in an embodiment of the present application.

As an optional implementation, while assigning a transport task, the method further includes: reducing scheduling on a rotation operation on a shelf. That is, in the case of symmetrical station layout, when allocating of a task, supposing that a face R of a shelf needs to be presented to a worker, to achieve which the shelf needs to be rotated in a station I, but does not need to be rotated in a station II mirrored with respect to the station I, then an order that generates the shelf task can be allocated to the station II, as shown in FIG. 4.

As an optional implementation, while assigning a transport task, the method includes: allocating a corresponding station queuing route layout mode for the transport task according to a task attribute in the transport task.

According to a specific implementation of an embodiment of the present application, the station queuing route layout mode includes a dual-station symmetrical layout mode, a parallel layout mode, a mode of queuing with no specific rotation zone, and a multi-operation point layout mode.

Figures 5, 6, 7:
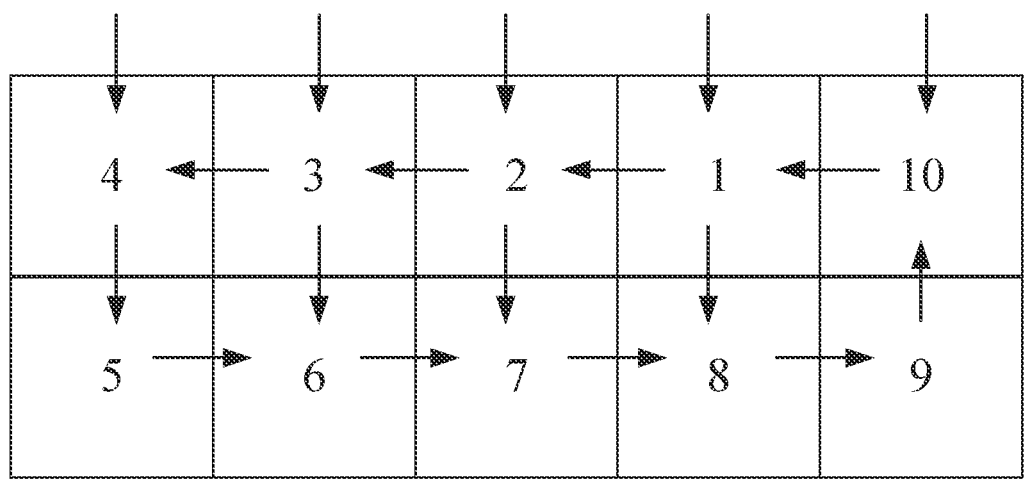
FIG. 5 is a schematic structural diagram of a dual-station symmetrical layout in an embodiment of the present application.
FIG. 6 is a schematic structural diagram of a parallel layout in an embodiment of the present application.
FIG. 7 is a schematic structural diagram of a mode of queuing with no specific rotation zone in an embodiment of the present application.

As shown in FIG. 5, in the dual-station symmetrical layout, an area enclosed by cells 1-12 is a rotation zone. The cell 8 or 9 is a position where a mobile robot stops and waits for a worker's operation. The cell 10 is an exit of a station queuing zone. A route for a mobile robot not rotating a shelf is: 1→4→7→9, or 12→5→7→9. The mobile robot can carry the shelf from the cell 11, 12, 2 or 3 into the rotation zone and perform rotation of the shelf in the rotation zone, and enter the cell 5, 6, 8 or 9 from the rotation zone, thereby returning to the queuing zone from the rotation zone. The specific cells are determined according to a free space in the queue. The mobile robot can also perform rotation in the cell 4, which as a second rotation point of the station queuing zone, thereby increasing the efficiency when multiple mobile robots need to perform rotation. Before rotation in the cell 4, a system locks cells in front of, in the rear of, to the left of, and to the right of the cell 4, to ensure the shelf is rotated safely.

As shown in FIG. 6, in the parallel layout, cells 1-12 form a queuing route, in which queuing can be clockwise or counterclockwise. A rotation zone is enclosed by the cells 1-12. A route for a mobile robot not rotating a shelf is: 1→4→6, or 12→5→6. The mobile robot can carry the shelf from the cell 2, 11 or 12 into the rotation zone and perform rotation of the shelf in the rotation zone, and enter the cell 3, 5 or 6 from the rotation zone, thereby returning to the queuing zone from the rotation zone. At the position of the cell 6, the mobile robot stops and waits for a worker's operation. The cell 10 is an exit of the station queuing zone. The station queuing zone can be arranged adjacent to each other, or it can be arranged several cells apart. The mobile robot can also perform rotation in the cell 4, which as a second rotation point of the station queuing zone, thereby increasing the efficiency when multiple mobile robots need to perform rotation. Before rotation in the cell 4, a system locks cells in front of, in the rear of, to the left of, and to the right of the cell 4, to ensure the shelf is rotated safely.

As shown in FIG. 7, in the mode of queuing with no specific rotation zone, an operation position is in a cell 8. A cell 10 is an exit of a station queuing zone. Any of cells 1-8 can be used as a shelf rotation position of the station queuing zone. Before a mobile robot rotates a shelf, the system locks cells in front of, in the rear of, to the left of, and to the right of the cell, and does not allow other mobile robots to enter, to ensure rotation safety. The mode of queuing with no specific rotation zone is not limited to the layout of 2 rows and 5 columns, which can be increased or decreased according to needs.

Figure 8:
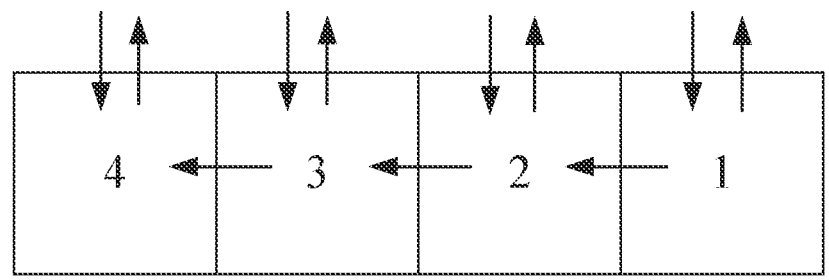
FIG. 8 is a schematic structural diagram of a multi-operation point station in an embodiment of the present application.

As an optional implementation, as shown in FIG. 8, the design of a station with multiple operation points adopts an in-line type, where a mobile robot can enter and leave each operation point independently. In such an operation position, the mobile robot does not need to queue and wait for another mobile robot in a process of heading to an operation point. The number of the operation points is not limited. When no surrounding cell is occupied, the mobile robot can rotate the shelf at the operation point; and in a route process of the mobile robot heading to the operation point, the mobile robot can apply for a surrounding cell to perform a shelf rotation task. Whether to put down the shelf or wait for operation completion by the mobile robot is determined according to shelf operation time. If the shelf operation time exceeds time for the mobile robot to perform the next task, the mobile robot can put down the shelf and further perform the next task. After a shelf operation is completed, the system allocates a mobile robot to take away the shelf.

As an optional embodiment, as shown in FIGS. 5, 6 and 7, in the dual-station symmetrical layout mode, the parallel layout mode, and the mode of queuing with no specific rotation zone, in order to avoid a head-to-tail deadlock of queuing mobile robots, a plurality of directions are set for the cell 10 serving as an exit position, so that in the case where shelf rotation needs to be carried out again after the operation is completed, the mobile robot can enter a station queuing zone again from the cell 10 serving as the exit position, and can also leave the station queuing zone from the cell 10 serving as the exit position and return to the station queuing zone via an external route.

As an optional implementation, a rotation operation is performed on the shelf in a process from the allocation to the completion of the transport task, that is, performing real-time inspection on a surrounding environment where the shelf is located in a process from the allocation to the completion of the transport task, and performing rotation if the environment where the shelf is located meets a rotation condition.

Figure 2:
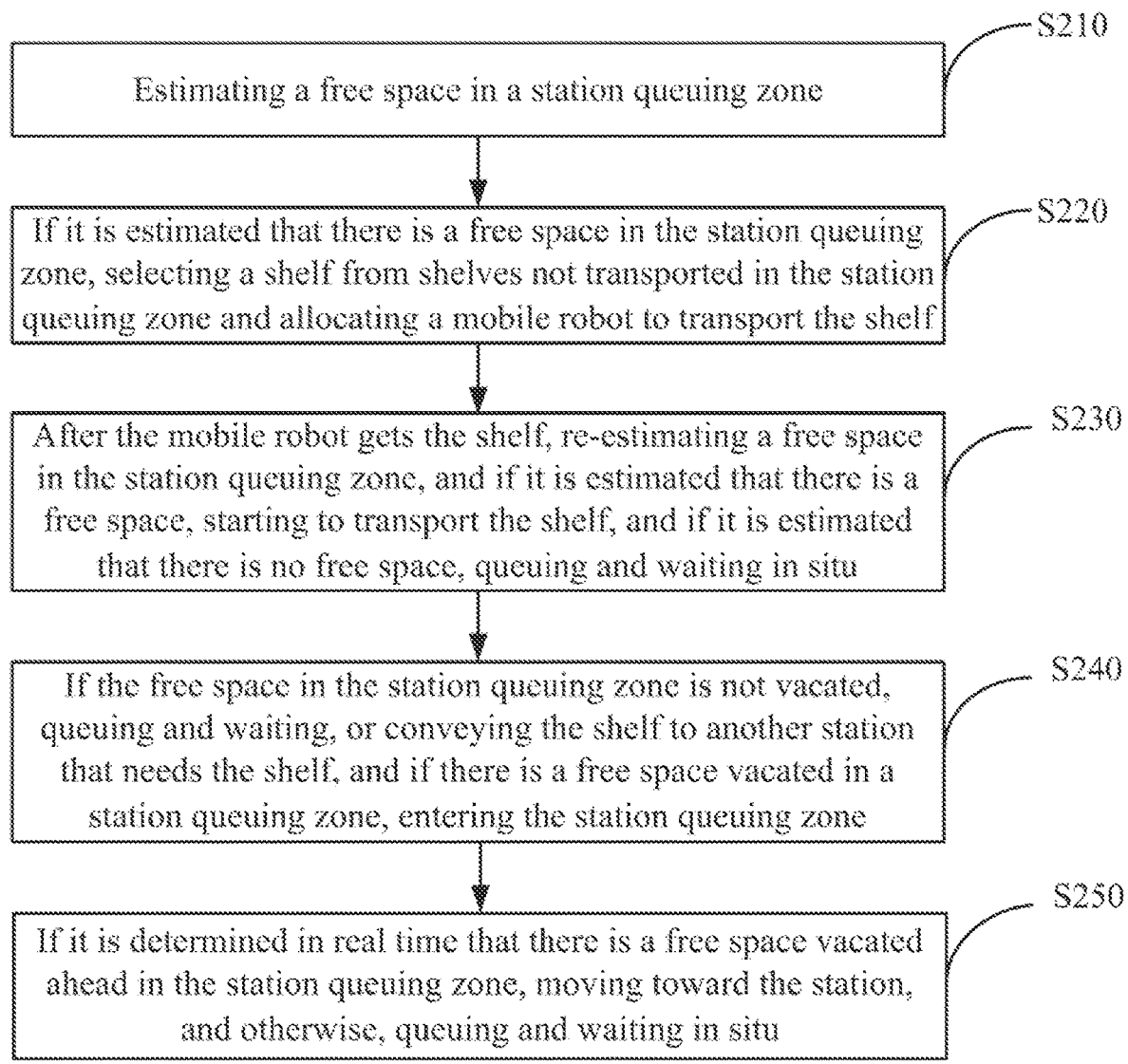
FIG. 2 is a flow diagram of planning a route for the transport tool to transport the shelf according to requirements of an order, and adjusting the traveling route of the transport tool in real time in an embodiment of the present application.

As an optional implementation, as shown in FIG. 2, planning a route for the transport tool to transport the shelf according to requirements of an order, and adjusting the traveling route of the transport tool in real time includes the following steps.

Step S210: estimating a free space in a station queuing zone.

Step S220: if it is estimated that there is a free space in the station queuing zone, that is, if there is a free space or it is estimated that there is a potential free space in the station queuing zone, selecting a shelf from shelves not transported in the station queuing zone and allocating a mobile robot to transport the shelf.

Step S230: after the mobile robot gets the shelf (getting the shelf means that the mobile robot has docked with the shelf but has not transported the shelf), re-estimating a free space in the station queuing zone, where estimation is performed on all stations that need the shelf, and if it is estimated that there is a free space, starting to transport the shelf, and if it is estimated that there is no free space, queuing and waiting in situ.

Step S240: when the shelf arrives at the vicinity of the station queuing zone, if the free space in the station queuing zone is not vacated, choosing a position with a low density of mobile robots that does not obstruct routes of other mobile robots to queue and wait, or conveying the shelf to another station that needs the shelf, and if there is a free space vacated in a station queuing zone, entering the station queuing zone.

Step S250: if it is determined in real time that there is a free space vacated ahead in the station queuing zone, moving toward the station, and if there is no free space vacated ahead, queuing and waiting in situ.

As an optional implementation, in step S210, estimating a free space in a station queuing zone includes: if the number of mobile robots (including the number of mobile robots within a station queuing zone) that are currently conveying shelves for a station is smaller than the size of the station queuing zone, there must be a vacant space. If the number of mobile robots that are currently transporting shelves for a station is greater than or equal to the size of the station queuing zone, calculating the time for a mobile robot at the tail of the station queuing zone to vacate a free space, the time being a sum of the time for all mobile robots queuing ahead to move a step and the time for a shelf at the head of the queue to stay and be operated, and if the time is less than the time for a newly allocated mobile robot to arrive at the station queuing zone, estimating that there is a potential free space.

As an optional implementation, if it is detected that the surrounding environment where the shelf is located is suitable for rotation, a rotation operation is performed on the shelf. There are three ways of performing a rotation operation on the shelf: performing rotation in a transporting route, performing rotation at a rotation point set in the station queuing zone, and performing rotation in situ at an operation point.

Figure 3:
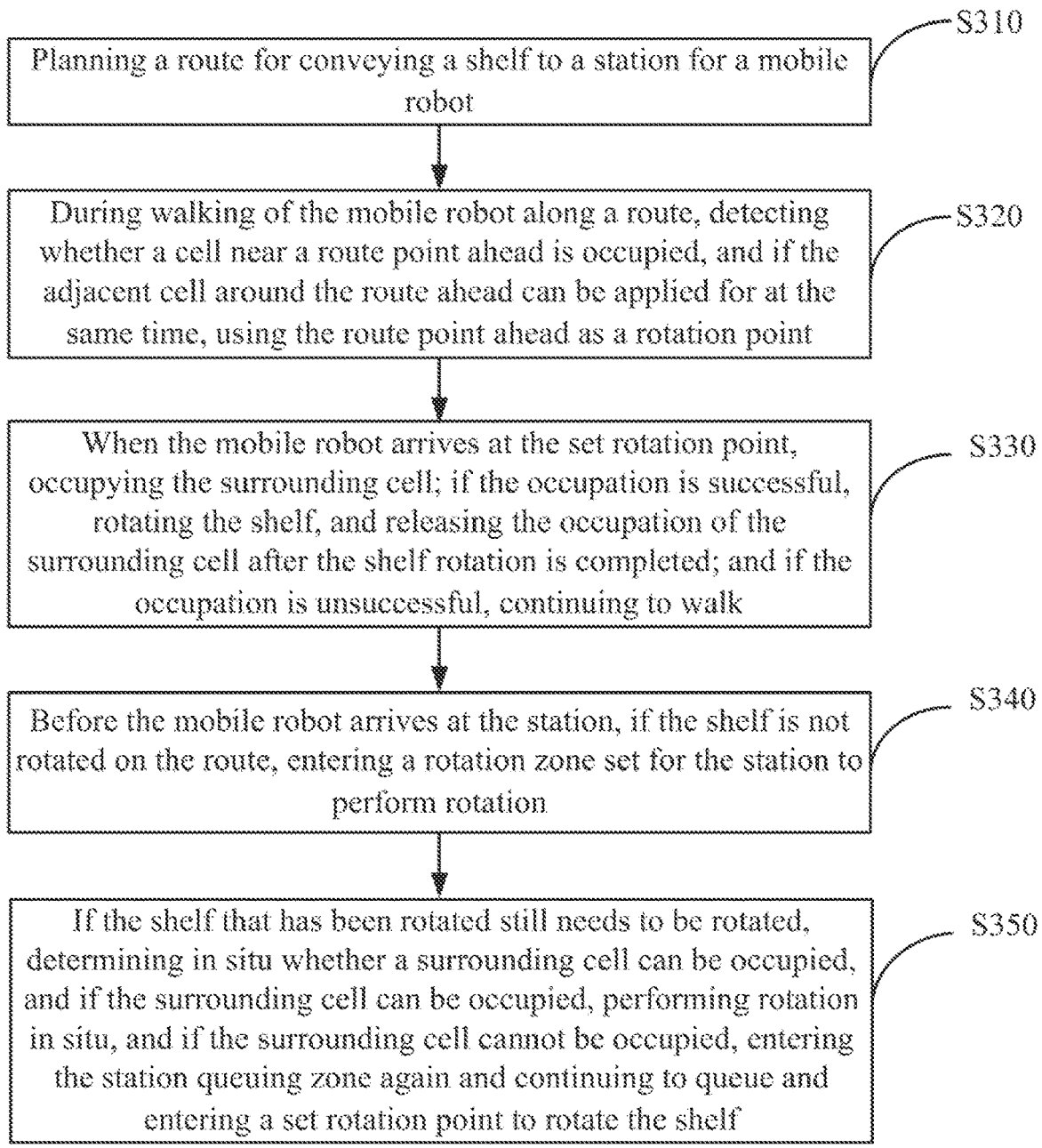
FIG. 3 is a flow diagram of a rotation operation on a shelf in an embodiment of the present application.

As an optional implementation, as shown in FIG. 3, performing real-time detection on a surrounding environment where the shelf is located within a traveling route from the allocation to the completion of the transport task, and if it is detected that the surrounding environment where the shelf is located is suitable for rotation, performing a rotation operation on the shelf includes the following steps.

Step S310: determining whether the shelf needs to be rotated; if rotation is not needed, directly preferentially planning a route; and if rotation is needed, proceeding to step S320.

Step S320: during walking of the mobile robot along a route, detecting whether a cell near a route point ahead is occupied, and if the adjacent cell around the route ahead can be applied for at the same time, using the route point ahead as a rotation point.

Step S330: when the mobile robot arrives at the set rotation point, occupying the surrounding cell; if the occupation is successful, rotating the shelf, and releasing the occupation of the surrounding cell after the shelf rotation is completed; and if the occupation is unsuccessful, continuing to walk.

Step S340: Before the mobile robot arrives at the station, if the shelf is not rotated on the route, entering a rotation zone set for the station to perform rotation.

Step S350: if the shelf that has been rotated still needs to be rotated, determining in situ whether a surrounding cell can be occupied, and if the surrounding cell can be occupied, performing rotation in situ, and if the surrounding cell cannot be occupied, entering the station queuing zone again and continuing to queue and entering a set rotation point to rotate the shelf.

Figure 9:
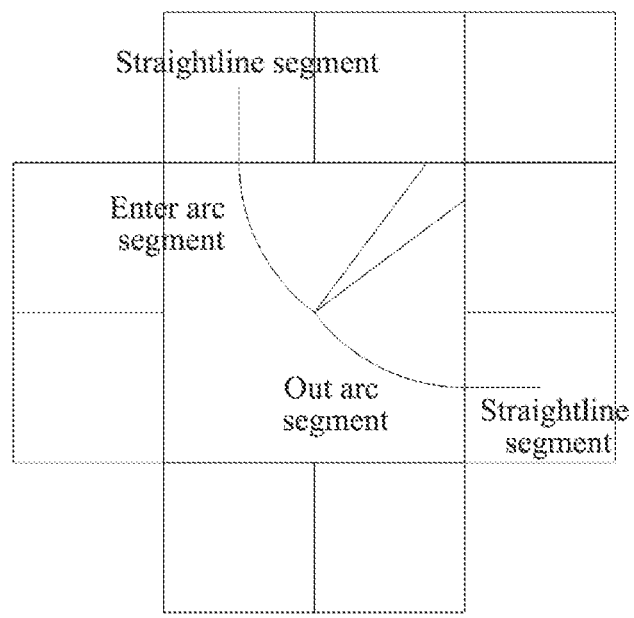
FIG. 9 is a schematic diagram of rotation in a rotation zone using a straightline plus circular arc path in an embodiment of the present application.

As an optional implementation, a straightline and arc line tangent route or a polyline route is used in the rotation zone to perform shelf rotation. During entering a specific rotation zone, if the entire path is an arc, a large margin between shelves is required. In the straightline and arc line tangent mode, the shelf is parallel to an adjacent shelf in a straightline section. In the polyline route mode, the shelf is always parallel to an adjacent shelf. By adopting the straightline plus circular arc mode or the polyline mode, when the shelf normally enters the rotation point, a gap left between shelves in the case of an entirely arc route is reduced, so that the shelf size can be larger for cells of the same size, and the warehouse space utilization is improved, as shown in FIG. 9.

Figure 10:
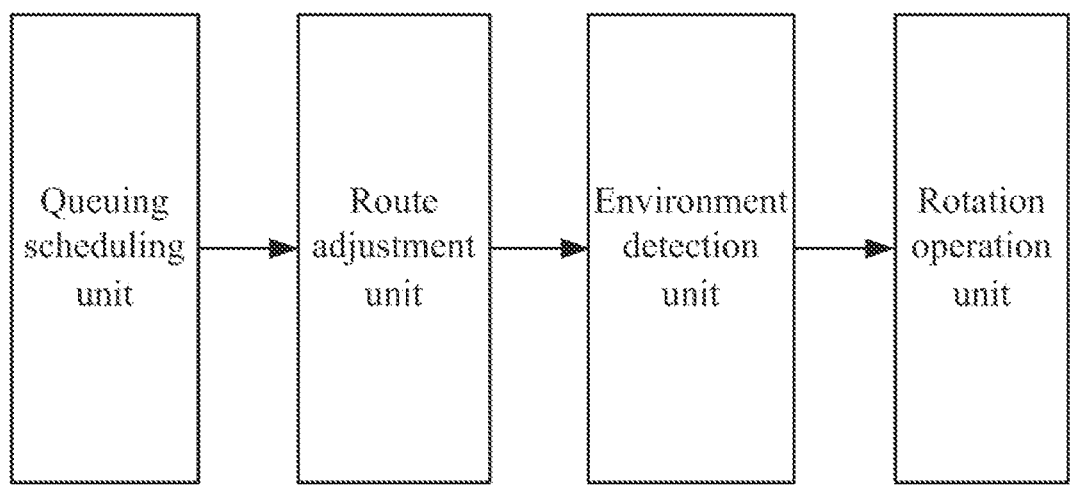
FIG. 10 is a structural block diagram of a shelf management apparatus in an embodiment of the present application.

In another aspect of the technical solution of the present application, as shown in FIG. 10, a shelf management apparatus is provided, the apparatus including: a queuing scheduling unit configured to, while assigning a transport task, perform queuing scheduling on a transport tool for transporting a shelf; a route adjustment unit configured to, plan a route for the transport tool to transport the shelf according to requirements of an order, and adjust the traveling route of the transport tool in real time; an environment detection unit configured to perform real-time detection on a surrounding environment where the shelf is located within a traveling route from the allocation to the completion of the transport task; and an rotation operation unit configured to, perform a rotation operation on the shelf when detecting that the surrounding environment where the shelf is located is suitable for rotation.

As an optional implementation, the transport tool is a mobile robot.

As an optional implementation, the queuing scheduling unit includes a transport allocation module configured to monitor task time and quantity of a transport tool in a station queuing zone in real time, and determine whether to allocate a new transport tool for transporting the shelf to the station according to the task time and quantity of the transport tool in the station queuing zone.

As an optional implementation, the queuing scheduling unit includes a queue-jump module configured to perform preferential queue-jump scheduling on a transport tool for a shelf that has a high priority or does not need to be rotated.

As an optional implementation, the queuing scheduling unit includes an optimized scheduling module configured to, while assigning a transport task, reduce scheduling on a rotation operation on a shelf.

As an optional implementation, the queuing scheduling unit further includes a queuing route layout allocation module configured to allocate a corresponding station queuing route layout mode for the transport task according to a task attribute in the transport task.

As an optional implementation, the station queuing route layout mode includes a dual-station symmetrical layout mode, a parallel layout mode, a mode of queuing with no specific rotation zone, and a multi-operation point layout mode.

As an optional implementation, in the multi-operation point layout mode, in a process of heading to an operation point, a transport tool does not need to queue and wait for another transport tool, and in the case where a cell around the transport tool is not occupied, the transport tool can perform a rotation operation on the shelf at the operation point; in a route process of the transport tool heading to an operation point, the mobile robot can apply for a surrounding cell to perform a shelf rotation task; and whether the next operation of the transport tool is to put down the shelf or wait for operation completion is determined according to shelf operation time; if the shelf operation time exceeds time for the transport tool to perform the next task, the transport tool puts down the shelf and further performs the next task, and after a shelf operation is completed, a transport tool is allocated to take away the shelf; and if the shelf operation time does not exceed the time for the transport tool to perform the next task, the transport tool waits for operation completion.

As an optional implementation, in the dual-station symmetrical layout mode, the parallel layout mode, and the mode of queuing with no specific rotation zone, a plurality of directions are set for an exit position so that in the case where shelf rotation needs to be carried out again after the operation is completed, the transport tool can re-enter a station queuing zone from the exit position, and can also leave the station queuing zone from the exit position and return to the station queuing zone via an external route.

As an optional implementation, the rotation operation unit includes a real-time inspection module configured to perform real-time inspection on a surrounding environment where the shelf is located in a process from the allocation to the completion of the transport task, and perform rotation when the environment where the shelf is located meets a rotation condition.

As an optional implementation, the route adjustment unit includes: an estimation module configured to estimate a free space in a station queuing zone; a selection module configured to, if it is estimated that there is a free space in the station queuing zone, select a shelf from shelves not transported in the station queuing zone and allocate a transport tool to transport the shelf; an evaluation module configured to, after the transport tool gets the shelf, re-estimate a free space in the station queuing zone, where estimation is performed on all stations that need the shelf, and if it is estimated that there is a free space, start to transport the shelf, and if it is estimated that there is no free space, queue and wait in situ; a first route planning module configured to, when the shelf arrives at the vicinity of the station queuing zone, if the free space in the station queuing zone is not vacated, choose a position with a low density of transport tools that does not obstruct routes of other transport tools to queue and wait, or convey the shelf to another station that needs the shelf, and if there is a free space vacated in a station queuing zone, enter the station queuing zone; and a determination module configured to, if it is determined in real time that there is a free space vacated ahead in the station queuing zone, move toward the station, and if there is no free space vacated ahead, queue and wait in situ.

As an optional implementation, the estimation module is configured to, if the number of mobile robots that are currently transporting shelves for a station is smaller than the size of a queuing zone of the station, estimate that there is a free space in the station queuing zone, and if the number of mobile robots that are currently transporting shelves for a station is greater than or equal to the size of a queuing zone of the station, calculate the time for a transport tool at the end of the station queuing zone to vacate a free space, and if the time is less than the time for a newly allocated transport tool to arrive at the station queuing zone, estimate that there is a free space.

As an optional implementation, there are three ways for the rotation operation unit to perform a rotation operation on the shelf: performing rotation in a transporting route, performing rotation at a rotation point set in the station queuing zone, and performing rotation in situ at an operation point.

As an optional implementation, the environment detection unit includes a detection module, a first rotation determination module, a second rotation determination module, and a third rotation determination module.

During walking of the transport tool along a route, whether a cell near a route point ahead is occupied is detected, and if the adjacent cell around the route ahead can be applied for at the same time, the route point is used as a rotation point; when arriving at the set rotation point, the transport tool occupies the surrounding cell, and if the occupation is successful, the transport tool rotates the shelf, and releases the occupation of the surrounding cell after the shelf rotation is completed, and if the occupation is unsuccessful, the transport tool continues to walk.

Before the transport tool arrives at the station, if the shelf is not rotated on the route, the transport tool enters a rotation zone set for the station to perform rotation; and in the case where the shelf that has been rotated still needs to be rotated, whether a surrounding cell can be occupied is determined in situ, and if the surrounding cell can be occupied, the transport tool performs rotation in situ, and if the surrounding cell cannot be occupied, the transport tool enters the station queuing zone again and continues to queue and enters a set rotation point to rotate the shelf.

As an optional implementation, a straightline and arc line tangent route or a polyline route is used in the rotation zone to perform shelf rotation.

Figure 11:
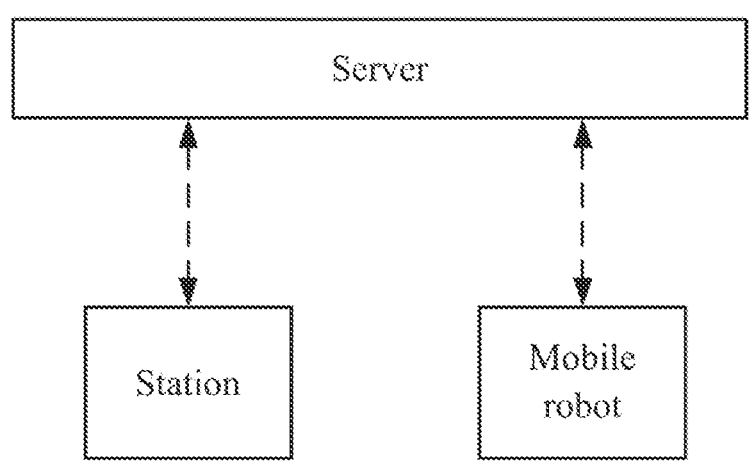
FIG. 11 is a structural block diagram of a shelf management system in an embodiment of the present application.

In another aspect of the technical solution of the present application, as shown in FIG. 11, a shelf management system is provided, the system including: a transport tool configured to transport the shelf; the shelf configured to be provided with locations for placing commodities and be transportable by the mobile robot; a shelf zone configured to store the shelf; and a server configured to execute the shelf management method in this technical solution to perform scheduling configuration on the transport tool and the shelf.

As an optional implementation, the transport tool is a mobile robot.

According to a specific implementation of the embodiment of the present application, the mobile robot is a wheel-driven trolley and is provided with a jacking mechanism, and has the abilities to walk in a straight line, walk in an arc line, and turn in situ.

As an optional implementation, the jacking mechanism and a trolley body move independently to achieve that the trolley body does not move, while the jacking mechanism performs descending and jacking operations; the trolley body does not move, while the jacking mechanism rotates; the trolley body and the jacking mechanism are locked up and rotate at a same speed; and the trolley body and the jacking mechanism rotate at different speeds at the same time.

As an optional implementation, the system further includes a station and a station queuing zone. The station is a worker operation position; and the station queuing zone is an area set near the worker operation position, where the transport tool transports the shelf, and queues and waits for a worker's operation.

The technical solution of the present application has the following beneficial effects.

1. The technical solution of the present application is directed to overall efficiency, and adopts a full-area queuing strategy, that is, while assigning a task, it extends robot queuing scheduling to an entire area, and the queuing starts from the time when a robot is assigned a task, and the robot task time and the number of robots in the station queuing zone are monitored in real time to determine whether to allocate a new robot to get a shelf and convey the shelf to a station. This overcomes the shortcoming of a limited number of robots that can be accommodated in a fixed queuing zone. Furthermore, the shelf rotation is refined into a task, in which a route rotation point is flexibly and dynamically set according to needs, and shelf rotation can be performed at multiple positions; and the symmetrical design of the station can reduce the need for a shelf rotation task. Thus, it overcomes the shortcomings that a bottleneck is likely to occur in the case of a fixed rotation zone, and that when multiple mobile robots need a side-turning operation, the queuing robots wait for a release of the rotation zone, so that the mobility becomes worse, thus achieving the purpose of improving the shelf transport efficiency.

2. Multiple directions are set for a queuing route to avoid deadlock.

3. Queuing has a queue-jump mechanism, in which a queue-jump route is set for a shelf that has a high priority or does not need to be rotated, to further improve the efficiency.

4. Multiple operation points are set in a station area. For a shelf to be operated for a long time, a robot can put the shelf down and continue to do other work, and after the operation is completed, the robot takes away the shelf, and another shelf is added at the same time, to further improve the efficiency.

5. The symmetrical layout of the station avoids generating a shelf rotation task when a task is assigned, to further improve the efficiency.

6. In the rotation zone, the shelf is rotated by using a straightline and arc line tangent route or a poly line route, and when the shelf normally enters the rotation point, a gap left between shelves in the case of an entirely arc route is reduced, so that the shelf size can be larger for cells of the same size, and the warehouse space utilization is improved, It should be noted that relational terms such as first and second herein are only used to distinguish one entity or operation from another entity or operation, and do not necessarily require or imply there is any such actual relationship or order between the entities or operations. Moreover, the terms "include", "contain" or any other variations thereof are intended to encompass non-exclusive inclusion, such that a process, method, article or device including a series of elements includes not only those elements, but also other elements not explicitly listed, or elements inherent to such a process, method, article or device. Without more restrictions, elements defined by the wording "including a . . . " do not exclude the presence of other identical elements in the process, method, article or device including the elements.

Multiple embodiments in the specification are described in a related manner. For the same and similar parts between the embodiments, reference can be made to each other. Each embodiment focuses on differences from other embodiments.

Logic and/or steps represented in a flow diagram or otherwise described herein, for example, can be regarded as a sequenced list of executable instructions for implementing a logical function, and can be embodied in any computer-readable medium, for use by or in combination with an instruction execution system, apparatus or device (such as a computer-based system, a system including a processor, or other system that can acquire and execute instructions from an instruction execution system, apparatus or device). For the specification, a "computer-readable medium" can be any apparatus that can contain, store, communicate, propagate or transmit a program for use by or in combination with an instruction execution system, apparatus or device. More specific examples (a non-exhaustive list) of the computer-readable medium include: an electrical connection part (electronic apparatus) with one or more wires, a portable computer disc cartridge (a magnetic apparatus), a random access memory (RAM), a read only memory (ROM), an erasable programmable read only memory (EPROM) or flash memory, an optical fiber, and a portable compact disk read-only memory (CD-ROM). In addition, the computer-readable medium can even be paper or other suitable medium on which the program can be printed, because, for example, the paper or other medium can be optically scanned, and then subjected to editing, interpretation or other suitable processing to obtain the program electronically and then store it in a computer memory.

It should be understood that multiple parts of the present application can be embodied in hardware, software, firmware, or a combination thereof.

In the above implementations, multiple steps or methods can be embodied in software or firmware stored in a memory and executed by a suitable instruction execution system. For example, if they are embodied in hardware, as in another implementation, they can be embodied by any one or a combination of the following techniques known in the art: a discrete logic circuit with a logic gate circuit for implementing a logic function of a data signal, an application specific integrated circuit with an appropriate combinational logic gate circuit, a programmable gate array (PGA), a field programmable gate array (FPGA) etc.

It can be understood that the term "a" should be understood as "at least one" or "one or more"; that is, in an embodiment, the number of an element may be one, while in other embodiments, the number of the element may be more than one, and the term "a" cannot be understood as a limitation on the number.

Although ordinal numbers such as "first" and "second" will be used to describe various components, those components are not limited here. The term is only used for distinguishing one component from another. For example, a first component may be referred to as a second component, and similarly, a second component may be referred to as a first component, without departing from the teachings of the inventive concept. The term "and/or" as used herein encompasses any and all combinations of one or more of associated listed items.

Terms as used herein are only used for the purpose of describing various embodiments and are not intended to be limiting. As used herein, a singular form is also intended to include a plural form, unless otherwise indicated clearly in the context. It will also be understood that the terms "including" and/or "having", when used in this specification, specify the presence of stated features, numbers, steps, operations, components, elements or combinations thereof, without excluding the presence or addition of one or more other features, numbers, steps, operations, components, elements or combinations thereof.

Terms as used herein, including technical and scientific terms, have the same meaning as terms commonly understood by those skilled in the art, as long as the terms are not defined differently. It should be understood that terms defined in commonly used dictionaries have meanings consistent with meanings of terms in the related art.

Figure 12:
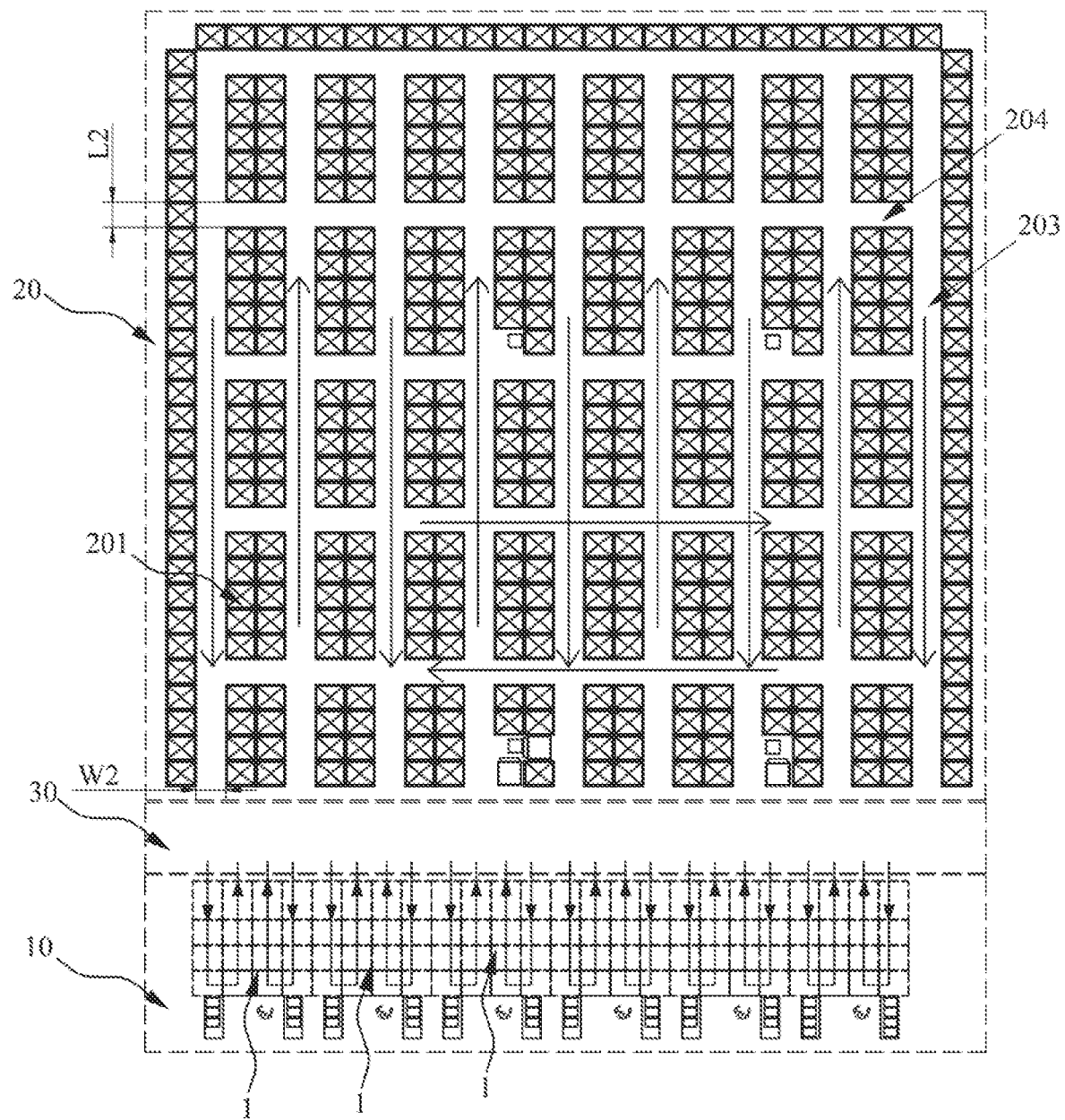
FIG. 12 is a schematic structural diagram of a stock sorting system provided in an embodiment of the present application.

FIG. 12 is a schematic structural diagram of a stock sorting system provided in an embodiment of the present application. As shown in FIG. 12, this embodiment provides a stock sorting system mainly used in a warehousing and logistics system in a "goods to person" mode, in which order goods are sorted from stock container 202 to order boxers. In this embodiment, the stock sorting system is described by using an application of the stock sorting system in "goods-to-person" sorting work as an example. However, it can be understood that the stock sorting system provided in this embodiment is not limited to goods sorting work, and may also be applied to conventional warehousing and logistics operations such as goods loading and stock check.

As shown in FIG. 12, the stock sorting system provided in this embodiment includes a stock container zone 20, a sorting zone 10, a common passage 30, and a sorting robot 40. The stock container zone 20 is configured to place stock containers 202, and storage containers 50 for storing goods are placed on the stock containers 202, and goods are placed in the storage container 50; the sorting zone 10 is spaced apart from the stock container zone 20 and is configured for a sorting operator to sort order goods and place the sorted order goods into the order boxes; the sorting robot 40 is configured to transport a stock container 202 in the stock container zone 20 to the sorting zone 10, or transport a stock container 202 from which sorting is completed back to stock container zone 20; the common passage 30 is provided between the stock container zone 20 and the sorting zone 10, and is used for high-speed traveling of the sorting robot 40 to achieve movement of the sorting robot 40 between the stock container zone 20 and the sorting zone 10.

When an order management center receives a pickup order, the order management center determines the position of a stock container 202 where order goods are located in the stock container zone 20, and dispatches the sorting robot 40; the order management center sends the position of the target stock container 202 to the sorting robot 40, and the sorting robot 40 autonomously navigates to the bottom of the target stock container 202 according to the position, and transports the target stock container 202 to the sorting zone 10; the sorting operator of the sorting zone 10 picks out the order goods from the target stock container 202 according to the pickup order and places the order goods into an order box; and the stock container 202 from which sorting is completed is conveyed by the sorting robot 40 from the sorting zone 10 back to the stock container zone 20 through the common passage.

As shown in FIG. 12, to achieve transporting of the stock container 202 in the stock container zone 20 by the sorting robot 40 and to achieve walking of the sorting robot 40 in the stock container zone 20, a plurality of stock container groups 201 are provided in the stock container zone 20, with a passage for the sorting robot 40 to travel being formed between every two adjacent stock container groups 201. To achieve reasonable and orderly planning of the stock container zone 20 and reduce obstacles to the walking of the sorting robot 40, in an embodiment, the stock container groups 201 in the stock container zone 20 are arranged in rows and columns. Each row of stock container group 201 at least includes one stock container group 201, with a transverse passage 204 arranged along a first direction being formed between every two adjacent rows of stock container groups 201, and each column of stock container group 201 at least includes one stock container group 201, with a longitudinal passage 203 arranged along a second direction being formed between every two adjacent columns of stock container groups 201. The first direction and the second direction are perpendicular to each other, and a "cross" intersection or a "T" intersection is formed at the junction of the transverse passage 204 and the longitudinal passage 203.

In this embodiment, each stock container group 201 at least includes one stock container 202, and in order to improve the utilization efficiency of the stock container zone 20, in an embodiment, each stock container group 201 includes a plurality of stock containers 202, and the plurality of stock containers 202 are arranged in rows and columns in the stock container group 201.

Figure 13:
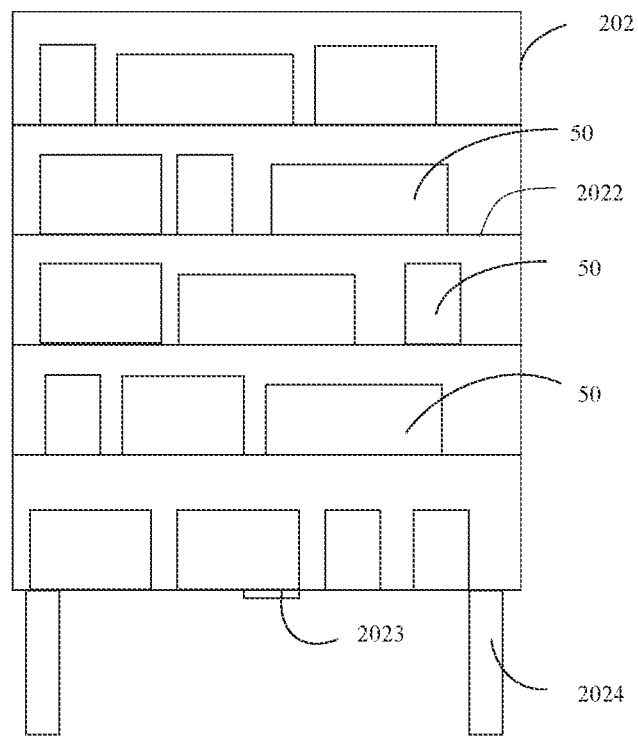
FIG. 13 is a schematic structural diagram of a stock container provided in an embodiment of the present application.

FIG. 13 is a schematic structural diagram of a stock container 202 provided in an embodiment of the present application. As shown in FIG. 13, the stock container 202 includes a plurality of partition layers 2022 spaced apart longitudinally and four floor-standing support columns 2024, where a variety of goods can be placed directly on each partition layers 2022, and the goods can also be placed within or on an outer surface of the stock container 202 by any suitable means such as hooks or rods in the stock container 202 or on the stock container 202. The partition layer 2022 of the stock container 202 may also be provided with a storage container 50. The storage container 50 may be separated from the stock container 202, or may be an integrated structure with the stock container 202. One or more pieces of goods can be placed in the storage container 50.

In this embodiment, the stock container 202 may be open on one side; that is, one piece of goods or one storage container 50 can be placed along the depth direction of the partition 2022. In another embodiment, the stock container 202 is open on two sides; that is, two pieces of goods or two storage containers 50 can be placed along the depth direction of the partition 2022 of the stock container 202; that is, one piece of goods or one storage container 50 is placed in each open direction. In another embodiment, the stock container 202 may also be open on four sides; that is, goods or storage containers 50 can be placed on the four sides of the stock container 202.

To facilitate subsequent description, a storage container 50 being provided on the partition 2022 of the stock container 202 is used as an example for description, and goods are placed in the storage container 50. It can be understood that whether goods are directly placed in the stock container 202 or placed in the stock container 202 through the storage container 50 does not influence the work of the stock sorting system in this embodiment.

To facilitate description of subsequent sorting, in this embodiment, an open side of the stock container 202 is referred to as a sorting face, that is, a face used for sorting and placing the storage container 50. A sorting operator can operate the goods in the storage container 50 on the stock container 202 through the sorting face of the stock container 202. That is, a stock container 202 with two open sides has two sorting faces opposite to each other, and the order goods can be placed in a storage container 50 corresponding to any sorting face of the stock container 202; a stock container 202 with one open side, a sorting operation only carried out on a storage container 50 corresponding to the sorting face; and a four-way opening stock container 202 has four sorting faces, and a sorting operation can be carried out on a storage container 50 corresponding to any of the four sorting faces.

Figure 14:
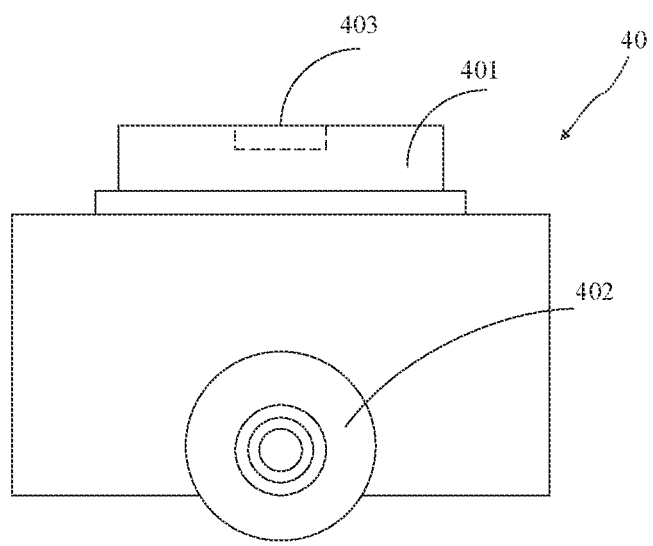
FIG. 14 is a schematic structural diagram of a sorting robot provided in an embodiment of the present application.

To facilitate the sorting robot 40 to transport the stock container 202, in this embodiment, the transporting of the stock container 202 by the sorting robot 40 is a jack-up type. FIG. 14 is a schematic structural diagram of a sorting robot 40 provided in an embodiment of the present application. As shown in FIGS. 12 and 14, the sorting robot 40 includes a driving mechanism 402 and a lifting mechanism 401. By using the driving mechanism 402, the sorting robot 40 can move in the sorting zone 10, the stock container zone 20, and common passage 30. The lifting mechanism 401 is configured to lift the stock container 202, such that the stock container 202 comes out of contact with the ground, thereby causing the stock container 202 to move. During transporting of the stock container 202 by the sorting robot 40, the sorting robot 40 travels through the transverse passage 204 and/or the longitudinal passage 203 to the bottom of the stock container 202 to be transported; and the lifting mechanism 401, which is connected with a pallet at the top, operates to cause the pallet to rise and come into contact with the bottom of the stock container 202, such that the support columns 2024 of the stock container 202 are separated from the ground; in this way, the sorting robot 40 lifts the entire target stock container 202 from the ground, and the sorting robot 40 causes the stock container 202 to move to a target position. When the sorting robot 40 finishes transporting the stock container 202, the lifting mechanism 401 operates to cause the pallet to descend, thereby causing the stock container 202 to fall into contact with the ground, and the pallet continues to descend till coming out of contact with the stock container 202, and the sorting robot 40 moves out of the bottom of the stock container 202 by using the driving mechanism 402 to achieve separation between the stock container 202 and the sorting robot 40.

In another embodiment, the transporting of the stock container 202 may also be submerged type. A butt-joint apparatus for butt-jointing the stock container 202 and the sorting robot 40 is provided at the bottom of the stock container 202 or at the top of the sorting robot 40. The sorting robot 40 travels along the transverse passage 201 and/or the longitudinal passage 203 in the stock container zone 20, and runs to the bottom of the stock container 202. After the stock container 202 and the sorting robot 40 come into butt-joint connection by the butt-joint apparatus, the stock container 202 is dragged to the target position.

In another embodiment, the transporting of the stock container 202 by the sorting robot 40 may also be traction type. The sorting robot 40 is hooked to the stock container 202 through a traction mechanism, and the sorting robot 40 moves to drag the stock container 202 to move. In other embodiments, the transporting of the stock container 202 by the sorting robot 40 may also be other forms, which are not listed one by one in this embodiment.

In this embodiment, the sorting robot 40 is further provided with a rotating mechanism connected with the pallet, and the rotating mechanism can cause the pallet to rotate, thereby causing the stock container 202 to rotate while keeping the traveling direction of the sorting robot 40 unchanged, to change the orientation of the stock container 202 during transporting. That is, in this embodiment, the rotation movement of the sorting robot 40 can be separated from the rotation movement of the stock container 202. The movement of the sorting robot 40 may be forward movement, backward movement, self-rotation for direction changeover, turning, or the like, and the orientation of the stock container 202 may be unchanged during the movement such as forward movement, backward movement and self-rotation for direction changeover of the sorting robot 40. When the orientation of the stock container 202 needs to be changed, the rotating mechanism can operate to cause the pallet to rotate, thereby causing the stock container 202 to rotate.

In this embodiment, the sorting robot 40 also has an autonomous navigation function. Using autonomous navigation being two-dimensional code navigation as an example, the sorting robot 40 further includes a navigation identification component configured to identify a two-dimensional code mark provided on the ground. The sorting robot 40 further includes a downward-facing camera. The sorting robot 40 can navigate to travel forward according to two-dimensional code information (may also be other ground mark) captured by the downward-facing camera, and can travel to the underside of the target stock container 202 as prompted by a control system according to a route determined by the control system. In other embodiments, in addition to the two-dimensional code navigation, the sorting robot 40 may also adopt other navigation mode, such as inertial navigation, or simultaneous localization and mapping (SLAM) navigation, or may also adopt a combination of two or more of the aforementioned navigation modes, such as two-dimensional code navigation and inertial navigation, or SLAM navigation and two-dimensional code navigation, or the like.

In an embodiment, the sorting robot 40 further includes a scanning apparatus 403 with a scanning head facing upward. As shown in FIG. 14, a tag code 2023 is provided at the exact center of the bottom of the target stock container 202. After the sorting robot 40 travels to the underside of the target stock container 202, the upward scanning apparatus 403 correctly photographs the tag code 2023 to ensure that the sorting robot 40 is just located directly below the target stock container 202, thereby ensuring that the sorting robot 40 can smoothly lift and transport the target stock container 202. In this embodiment, the tag code 2023 is a two-dimensional code, and the scanning apparatus 403 is a camera. In other embodiments, the tag code 2023 may be a bar code, a radio frequency identification (FRID) tag or the like, and the type of the scanning apparatus 403 corresponds to the type of the tag code 2023.

In this embodiment, to reduce obstacles to the transporting of the stock container 202 by the sorting robot 40, in this embodiment, two columns of stock containers 202 are provided in each stock container group 201, and a plurality of stock containers 202 are arranged side by side along the second direction in each column of stock containers 202. That is, each stock container 202 faces a same longitudinal passage 203. When the sorting robot 40 transports any stock container 202 in the stock container group 201, sorting robot 40 can enter a space underneath the stock container 202 through the longitudinal passage 203 that the stock container 202 faces, and after the stock container 202 is jacked up by the sorting robot 40, the stock container 202 is brought into the longitudinal passage 203, so that the stock container 202 is moved out; or when the stock container 202 needs to be moved back to the initial position of the stock container group 201, the sorting robot 40 drives the stock container 202 to move into the initial position through the longitudinal passage 203, to achieve the reset of the stock container 202. That is, providing two columns of stock containers 202 in each stock container group 201 can avoid interference with other stock containers 202 in the stock container group 201 when the sorting robot 40 transports a stock container 202, thereby improving the transport efficiency. In another embodiment, two rows of stock containers 202 may alternatively be provided in each stock container group 201, and each row of stock containers 202 includes a plurality of stock containers 202, that is, each stock container in the stock container group 201 202 is adjacent to a transverse passage 204, and the sorting robot 40 can move the target stock container 202 out of or into the stock container group 201 through the corresponding transverse passage 204. In other embodiments, to improve the compactness of the arrangement of the stock container zone 20 and save the space of the stock container 202, each stock container group 201 can be provided with more than two columns and more than two rows of stock containers 202. In this case, some of the stock containers 202 in the group 201 are surrounded by other stock containers 202 at the periphery. To transport the target stock container 202, another one or more sorting robots 40 need to be dispatched at the same time to move away a stock container 202 on a side of the target stock container 202, and thereafter, the target stock container 202 is transported.

To improve the utilization rate of the stock container zone 20, a stock container group 201 is respectively provided at each of three edges of the stock container zone 20 which are not adjacent to the sorting zone 10, where the stock container zone 20 is arranged along the first direction, and the stock container group 201 away from an edge of the stock container zone 20 includes a row of stock containers 202; two columns of stock containers 202 are respectively arranged at two edges along the second direction of the stock container zone 20; and two ends of the row of stock containers 202 are in butt-joint with two ends of the two columns of stock containers 202, so that the stock container zone 20 forms a semi-closed space that is open toward the sorting zone 10.

In this embodiment, the common passage 30 is arranged along the first direction and is located between the sorting zone 10 and the stock container zone 20. The sorting robot 40 enters or exits the stock container zone 20 through the common passage 30, or enters or exits the sorting zone 10, or moves between the sorting zone 10 and the stock container zone 20. Therefore, the density of the sorting robot 40 in the common passage 30 is greater than the density of the sorting robot 40 in the stock container zone 20 and the sorting zone 10. To reduce obstacles to the traveling of the sorting robot 40, no obstacles are provided in the common passage 30.

In this embodiment, the common passage 30 includes four traveling passages arranged along the first direction, and sorting robots 40 in two adjacent traveling passages are allowed to travel in opposite directions to avoid collision during traveling of the sorting robots 40 in the common passage 30, and also ease the traffic in the common passage 30. In other embodiments, the number of traveling passages in the common passage 30 may be two, or may also be six or more, and in an embodiment, the number of traveling passages in the common passage 30 is even number, and the traveling direction of the sorting robots 40 in two adjacent traveling passages are opposite.

The sorting zone 10 is provided on a side of the stock container zone 20, and the sorting zone 10 faces the open side of the stock container zone 20. In this embodiment, sorting is performed manually; that is, a sorting operator sorts order goods in the stock container 202 conveyed to the sorting zone 10. In other embodiments, an automatic sorting mode may alternatively be adopted, that is, a robotic arm is used to sort the order goods in the stock container 202 moved to the sorting zone 10. In this embodiment, manual sorting is used as an example to describe the sorting work in the sorting zone 10.

The sorting zone 10 includes a plurality of sorting stations 1 arranged side by side along the first direction, and in each sorting station 1, order goods are sorted by one sorting operator. In this embodiment, the number of the sorting stations 1 in the sorting zone 10 can be set autonomously according to needs.

Figure 15:
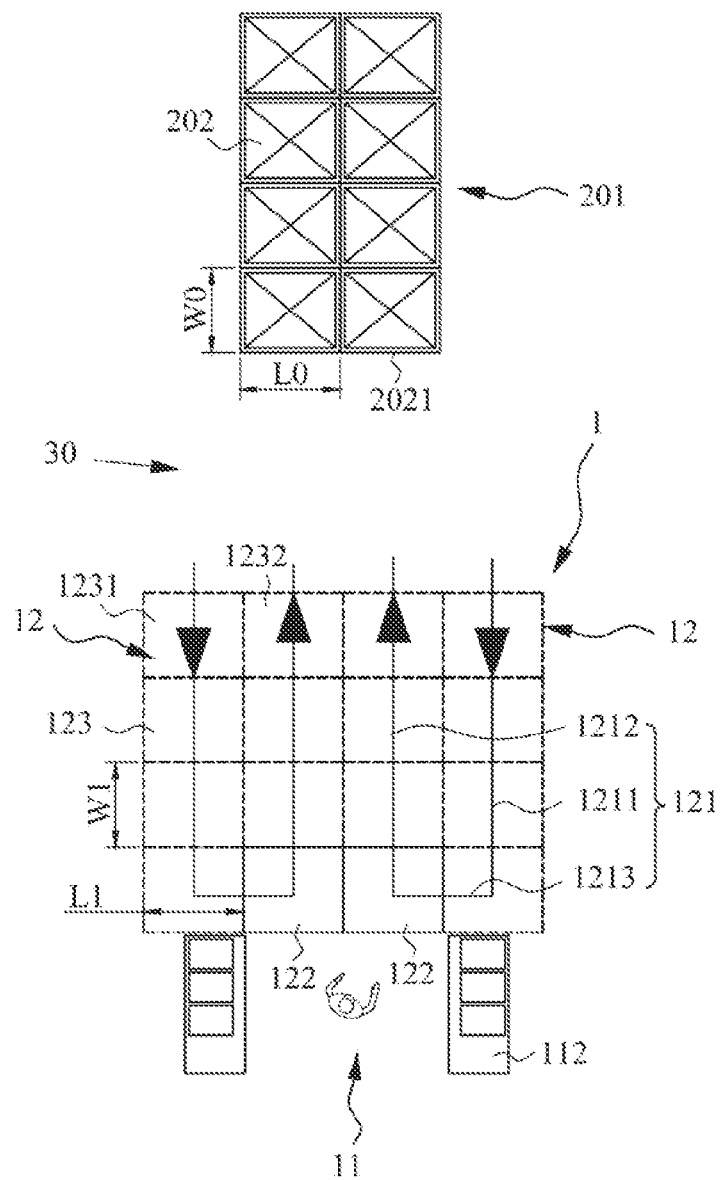
FIG. 15 is a schematic structural diagram of a sorting station in FIG. 12.

FIG. 15 is a schematic structural diagram of a sorting station and a stock container provided in an embodiment of the present application. As shown in FIG. 12 and FIG. 15, in this embodiment, each sorting station 1 is provided with two sorting points 122 and two sorting passages 121, and the sorting passages 121 are arranged in a one-to-one correspondence with the sorting points 122, so that each sorting passage 121 provides a route for the sorting robot 40 to pass the corresponding sorting point 122. In addition, the two sorting points 122 of each sorting station 1 can be used by the same sorting operator to sort target goods.

In this embodiment, as two sorting points 122 and sorting passages 121 corresponding to the sorting points 122 are provided in each sorting station 1, and each sorting passage 121 enables the sorting robot 40 to enter the corresponding sorting point 122 so that a given sorting operator can be responsible for the sorting at the two sorting points 122, and after the sorting operator has finished sorting the stock container 202 at one sorting point 122, and the sorting robot 40 entering from the sorting passage 121 has not yet conveyed a stock container 202 to the sorting point 122, the sorting operator can perform sorting in the stock container 202 waiting for sorting at the other sorting point 122, thus reducing the idle waiting time of the sorting operator, and improving the sorting efficiency.

In this embodiment, the sorting passage 121 is U-shaped, open toward the stock container zone 20, and both an entrance and an exit of the sorting passage 121 face the stock container zone 20. In an embodiment, the sorting passage 121 is formed by planning with a two-dimensional grid arranged in a rectangular array, which is beneficial to improving the regularity of the sorting passage 121, and thereby improving the planning consistency and layout compactness of the entire sorting zone 10.

In this embodiment, to reduce the traveling route of the sorting robot 40 and improve the space utilization of the sorting zone 10, the sorting passage 121 is formed by planning with two columns of two-dimensional grid groups arranged side by side in the first direction, and each column of two-dimensional grid group includes a plurality of two-dimensional grids 123 arranged side by side in the second direction. A connecting line of centers of one column of two-dimensional grid group along the second direction forms an entrance passage 1211 of the U-shaped passage, and a two-dimensional grid 123 of the entrance passage 1211 in butt-joint with the common passage 30 is an entrance grid 1231; a connecting line of centers of the other column of two-dimensional grid group along the second direction is an exit passage 1212 of the U-shaped passage, and a two-dimensional grid 123 of the exit passage 1212 in butt-joint with the common passage 30 is an exit grid 1232; a connecting line of centers of the two-dimensional grids 123 at tail ends the two columns of two-dimensional grid groups away from the common passage 30 forms a direction changeover passage 1213 of the U-shaped passage, the direction changeover passage 1213 being arranged in the first direction, and two ends of the direction changeover passage 1213 being respectively connected to the tail ends of the exit passage 1212 and the entrance passage 1211; and when traveling to the junction of the direction changeover passage 1213 and the entrance passage 1211, or the junction of the direction changeover passage 1213 and the exit passage 1212, the sorting robot 40 self-rotates for direction changeover, to change the traveling direction of the sorting robot 40.

In an embodiment, each column of two-dimensional grid group includes four two-dimensional grids 123 to improve the space utilization of the sorting zone 10 and the space compactness of the stock sorting system.

In this embodiment, the two-dimensional grids 123 may be formed by virtual logical division in a controller of the stock sorting system, or may be formed by grid marking in an actual site. To better implement navigation of the sorting robot 40 traveling along the sorting passage 121, in this embodiment, a reference mark for positioning of the sorting robot 40 is provided in the center of at least one two-dimensional grid. In an embodiment, a reference mark for navigation of the sorting robot 40 is affixed to the center of each two-dimensional grid 123. In an embodiment, the reference mark is a two-dimensional code, and the sorting robot 40 is provided with a camera for scanning the two-dimensional code. The navigation of the sorting robot 40 by using a two-dimensional code is a conventional technical means in the art, and its principles and specific operations are not described in this embodiment.

In this embodiment, a sorting point 122 is provided at the bottom of the U shape of the sorting passage 121, and a sorting work zone 11 configured for the sorting operator to move is provided on a side of the sorting passage 121 away from the stock container zone 20. To improve the space utilization and layout compactness, in an embodiment, the two sorting passages 121 of the same sorting station 1 are arranged adjacent to each other. Moreover, to reduce the moving distance of the sorting operator during switching between sorting points 122, in this embodiment, in the two two-dimensional grid group forming one sorting passage 121, a two-dimensional grid located at the bottom end and adjacent to the other sorting passage 121 forms a sorting point 122, so that the two sorting points 122 can be arranged side by side and adjacent to each other, to reduce the distance between the two sorting points 122. In other embodiments, the two-dimensional grids forming the two sorting points 122 may alternatively be spaced apart. In this embodiment, the exit passage 1212 of each sorting passage 121 is adjacent to another sorting passage 121 of the same sorting station 1. That is, in this embodiment, the sorting point 122 occupies the two-dimensional grid 123 at the junction of the exit passage 1212 and the direction changeover passage 1213. When the sorting robot 40 travels to the sorting point 122 through the entrance passage 1211 and the direction changeover passage 1213, the stock container 202 transported by the sorting robot 40 is sorted at the sorting point 122 by the sorting operator. After the sorting is completed, the sorting robot 40 moves out of the sorting station 1 along the exit passage 1212.

To avoid collision and interference between sorting robots 40 or between stock containers 202 transported by the sorting robots 40, in this embodiment, each two-dimensional grid 123 can be occupied by only one sorting robot 40. To improve the sorting efficiency, when there is a sorting robot 40 for sorting at the sorting point 122, a two-dimensional grid between the entrance grid 1231 of the sorting passage 121 and the sorting point 122 forms a waiting area for the sorting robot 40 to travel and wait, and each waiting area can accommodate one sorting robot 40 waiting in the waiting area to move to the sorting point 122. Furthermore, when sorting on the sorting robot 40 located on the sorting point 122 is completed and the sorting robot moves out of the sorting point 122, the next waiting sorting robot 40 transporting a stock container 202 moves to the sorting point 122 and waits for sorting. To avoid blockage of the sorting passage 121, there is no waiting sorting robot 40 in any two-dimensional grid 123 corresponding to the exit passage 1212 except the two-dimensional grid 123 occupied by the sorting point 122, and after sorting on the sorting robot 40 is completed, the sorting robot directly moves out of the sorting station 1 from the exit passage 1211. As there is no stranded sorting robot 40 in the exit passage 1212, by arranging the exit passages 1212 of the two sorting passages 121 to be adjacent to each other, the traveling interference between sorting robots 40 can be reduced.

In this embodiment, to improve the sorting efficiency, two put walls 112 for placing order boxes are arranged in the sorting work zone 11. The two put walls 112 are arranged oppositely, and the two sorting points 122 are located at an extension side of a space formed by the two put walls 112, and a plurality of order containers for storing order boxes are arranged on each put wall 112. This configuration can increase the number of order boxes stored in the sorting work zone 11, that is, increase the number of orders that can be handled by the sorting operator synchronously.

To further facilitate the sorting by the sorting operator, a display screen is provided in the sorting work zone 11, and the display screen is communicatively connected with the controller of the stock sorting system, and is configured to display order information and sorting information of the sorting that the sorting station 1 is responsible for, to facilitate the sorting operator sorting goods with reference to the order information. The order information at least includes the type of the order goods in each pick-up order, the quantity of each type of order goods, a stock container 202 corresponding to each type of order goods, and the position of each type of order goods on the stock container 202. The sorting information may include a currently sorted stock container 202, the type of target goods on the currently sorted stock container 202, the position of each type of target goods on the currently sorted stock container 202, the sorted quantity of each type of target goods on the currently sorted stock container 202, the position of one or more order boxes corresponding to each type of target goods on a put wall 112, and the like.

In this embodiment, the sorting operator can sort only one order at a time; that is, only after the target goods of an order have been sorted, can the sorting for the next order begin. However, as multiple orders usually have same goods or goods in the same stock container 202, in order to improve the sorting efficiency, in an embodiment, the sorting operator can perform sorting operations on multiple orders at the same time. Single-order sorting and multi-order synchronous sorting are both conventional technical means in the art, and are not described in this embodiment.

In this embodiment, when a stock container 202 is placed in the stock container zone 20, a sorting face 2021 of the stock container 202 faces the sorting zone 10, and the sorting face 2021 of the stock container 202 is oriented same as a work face of a sorting point 122. The work face of the point 122 is a side of the sorting point 122 facing the sorting working area 11. That is, in the process that the sorting robot 40 carrying the stock container 202 travels to the sorting point 122, sorting of goods by the sorting operator can be achieved without rotating the stock container 202 for direction changeover. This is applicable to a scenario that the stock container 202 has two opposite open sides, and on each partition layer 2022 of the stock container 202, at least one storage container 50 can be arranged side by side in the first direction, and only one storage container 50 is arranged in the second direction; or the stock container 202 has four open sides, but only one storage container 50 is provided on each partition layer 2022 of the stock container 202.

In this embodiment, the length of the stock container 202 in the first direction is $L_0$, and the width of the stock container 202 in the second direction is $W_0$. To ensure the transporting of the stock container 202 in the stock container zone 20, the width $L_2$ of the transverse passage 204 is greater than $L_0$, the width $W_2$ of the longitudinal passage 203 is greater than $W_0$. To ensure the traveling of the stock container 202 in the sorting zone 10 and avoid collision during the traveling of the sorting robot 40, the length $L_1$ of each two-dimensional grid 123 along the first direction is greater than $L_0$, and the width $W_1$ of each two-dimensional grid 123 in the second direction is greater than $W_0$. Furthermore, to improve the space utilization, $W_1$ is slightly larger than $W_0$, and $L_1$ is slightly larger than $L_0$. In an embodiment, to improve the space utilization and the convenience of route planning, the sizes of respective two-dimensional grids 123 are same.

The stock sorting system provided in this embodiment further includes a control system for controlling operations of multiple components in the stock sorting system. The control system includes an order management center configured to receive orders from and deliver orders to sorting robots and sorting stations.

This embodiment further provides a sorting method, which is applied to the above-mentioned stock sorting system. The sorting method provided in this embodiment includes the following steps.

Step S1010: an order management center receives a pick-up order, analyzes the position of a target stock container 202 corresponding to order goods in the pick-up order in a stock container zone 20, and at the same time plans a target sorting station 1 corresponding to the pick-up order.

Step S1020: the order management center dispatches a sorting robot 40, and plans a first traveling route for the sorting robot 40 according to an initial position of the sorting robot 40 and the position of the target stock container 202.

Step S1030: the sorting robot 40 travels to the bottom of the target stock container 202 according to the first traveling route.

Step S1040: a lifting mechanism 401 of the sorting robot 40 operates to cause a pallet to rise and come into contact with the bottom of the stock container 202 until the target stock container 202 comes out of contact with the ground.

Step S1050: a control system determines a target sorting passage 121 that the sorting robot 40 needs to enter according to the congestion of sorting robots 40 in two sorting passages 121 in the target sorting station 1.

Step S1060: the control system plans a second traveling route for the sorting robot 40 according to the position of an entrance grid of the target sorting passage 121 and the position of the target stock container 202.

Step S1060: the sorting robot 40 travels to the entrance grid of the target sorting passage 121 according to the second traveling route, where during this process, the target stock container 202 does not perform direction changeover movement, and the sorting robot 40 can perform forward movement, backward movement, self-rotation for direction changeover, or the like.

Step S1070: the sorting robot 40 moves forward along a second direction according to an entrance passage to a tail end of the entrance passage, self-rotates 90° and travels along a direction changeover passage 1213 to the sorting point 122.

Step S1080: a sorting operator sorts target goods on the target stock container 202.

Step S1090: after the sorting is completed, the sorting robot 40 self-rotates 90° for direction changeover and travels along an exit passage 1212 to an exit grid 1232 while carrying the stock container 202.

Step S1100: the control system plans a third traveling route according to the position of the exit grid 1232 and the position of the target stock container 202 in the stock container zone 20, and the sorting robot 40 transports the stock container 202 back to the stock container zone 20 according to the third traveling route.

Step S1110: the lifting mechanism 401 of the sorting robot 40 operates to cause the pallet to descend until the stock container 202 comes into contact with the ground and the pallet comes out of contact with the bottom of the stock container 202.

Step S1120: a driving mechanism 402 of the sorting robot 40 operates such that the sorting robot 40 moves out of the bottom of the stock container 202 and becomes separated from the stock container 202.

This embodiment further provides a warehousing and logistics system, which includes the above-mentioned stock sorting system.

Figure 16:
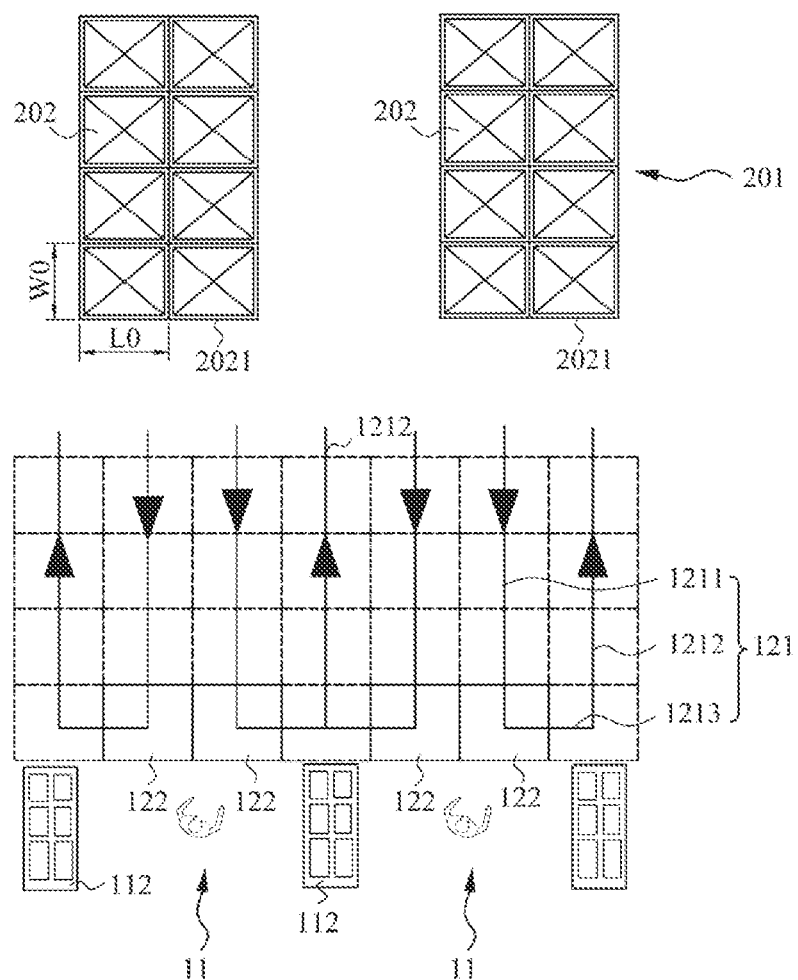
FIG. 16 is a schematic structural diagram of a sorting station and a stock container provided in an embodiment of the present application.

FIG. 16 is a schematic structural diagram of a stock sorting system provided m an embodiment of the present application. As shown in FIG. 16, this embodiment provides a stock sorting system, which is mainly used to implement "goods-to-person" sorting of order goods, and may also achieve conventional warehousing and logistics operations such as goods loading and stock check. In this embodiment, the stock sorting system includes a stock container zone 20, a common passage 30, a sorting zone 10, and sorting robots 40. The arrangements of the stock container zone 20, the common passage 30, the sorting zone 10, and the sorting robots 40 are substantially the same as in Embodiment I, with the only difference in the configuration of the sorting passage 121 in the sorting station 1. Same structures as in Embodiment I will not be repeated in this embodiment.

In this embodiment, in a given sorting station 1, an entrance passage 1211 of each sorting passage 121 is arranged adjacent to another sorting passage 121, and an exit passage 1212 of each sorting passage 121 is arranged adjacent to another sorting station 1.

In this embodiment, to further improve the space utilization of the sorting zone, in two adjacent sorting stations 1, two adjacent sorting passages 1211 share one exit passage 1212.

In this embodiment, two adjacent sorting stations 1 may share one put wall 112, and the put wall 112 has two open sides, each for placing order containers. Alternatively, one put wall 112 may be provided in a sorting work zone 11 of a sorting station 1, and the put wall 112 is spaced apart from a sorting point 122, and a sorting operator is allowed to move between the put wall 112 and the sorting point 122.

Figure 17:
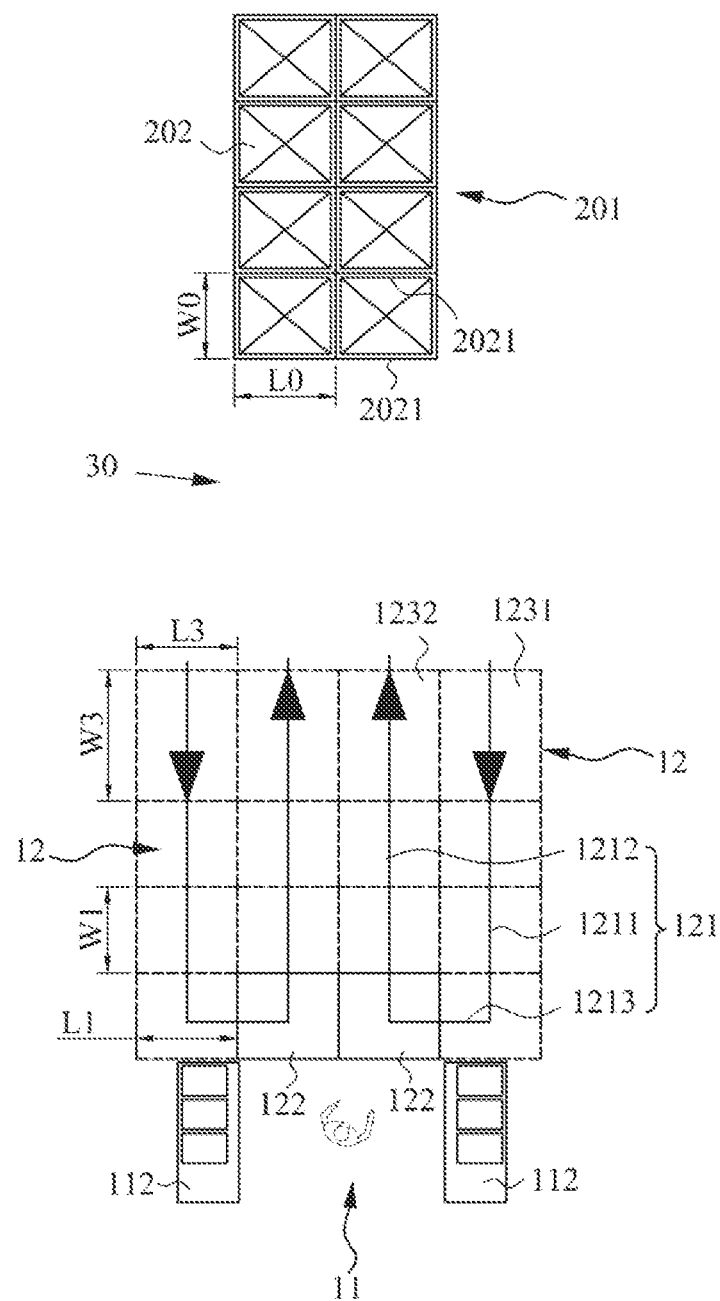
FIG. 17 is a schematic structural diagram of a sorting station and a stock container provided m an embodiment of the present application.

FIG. 17 is a schematic structural diagram of a stock sorting system provided in an embodiment of the present application. As shown in FIG. 17, this embodiment provides a stock sorting system, which is mainly used to implement "goods-to-person" sorting of order goods, and may also achieve conventional warehousing and logistics operations such as goods loading and stock check. In this embodiment, the stock sorting system includes a stock container zone 20, a common passage 30, a sorting zone 10, and sorting robots 40. The arrangements of the stock container zone 20, the common passage 30, the sorting zone 10, and the sorting robots 40 are substantially the same as in Embodiment I, with the only difference in the configuration of the stock container 202 in the stock container zone 20 and the configuration of the two-dimensional grid 123. Same structures as in Embodiment I will not be repeated in this embodiment.

In this embodiment, the stock container 202 is open on two sides, where one open side of the stock container 202 faces the sorting zone 10, and the other open side faces away from the sorting zone 10. Each partition layer 2022 of the stock container 202 is provided with two rows of storage containers 50 side by side along the second direction, and each row of storage container 50 includes at least one storage container 50. That is, the stock container 202 has two opposing sorting faces 2021, and each sorting face 2021 can only be used for taking and placing the storage container 50 on the corresponding open side. In this case, if the target goods is placed at a sorting face 2021 facing the sorting zone 10, when the sorting robot 40 transports the stock container 202, the stock container 202 does not need direction changeover to implement sorting; and if the target goods is placed at a sorting face 2021 away from the sorting zone 10, during the process of transporting the stock container 202 by the sorting robot 40 to the sorting point 122, the stock container 202 needs to be rotated 180° such that the sorting face 2021 corresponding to the target goods faces the sorting work zone 11.

In this embodiment, the length of the stock container 202 in the first direction is $L_0$, and the width of the stock container 202 in the second direction is $W_0$. To ensure the traveling of the sorting robot 40 carrying the stock container 202 in the stock container zone 20 and the sorting zone 10 and avoid interference and collision with other sorting robots 40 or stock containers 202, the width $L_2$ of the transverse passage 204 is greater than $L_0$, and the width $W_2$ of the longitudinal passage 203 is greater than $W_0$; and the length $L_1$ of each two-dimensional grid 123 in the first direction is greater than $L_0$, and the width $W_1$ of each two-dimensional grid 123 in the second direction is greater than $W_0$. To improve the space utilization, $W_1$ is slightly larger than $W_0$, and $L_1$ is slightly larger than $L_0$.

In this embodiment, each sorting passage 121 is provided with a rotation zone for the stock container 202 to rotate for direction changeover, and as the stock container 202 needs to be rotated for direction changeover before traveling to the sorting point 122, the rotation zone is one of corresponding two-dimensional grids 123 forming an entrance passage 1211. In an embodiment, an entrance grid 1231 of each sorting passage 121 forms the above-mentioned rotation zone, to ensure the consistency of subsequent two-dimensional grids 123, reduce the difficulty of planning, and avoid traveling interference between sorting robots 40. In other embodiments, the above-mentioned rotation zone may also be formed by any one of the two-dimensional grids 123 forming the entrance passage 1211.

In this embodiment, to avoid interference with the traveling of sorting robots 40 around the rotation zone at the time of direction changeover of the stock container 202, and to maintain the planning consistency of the sorting zone 10, the length $L_3$ of the two-dimensional grid 123 corresponding to the rotation zone in the first direction is consistent with the length $L_1$ of a two-dimensional grid 123 corresponding to a non-rotation zone in the first direction, and the width of the two-dimensional grid 123 corresponding to the rotation zone in the second direction is greater than a maximum outer diameter of the stock container 202, that is, $W_3 \geq \sqrt{W_0^2 + L_0^2}$.

In this embodiment, to ensure the planning consistency of cells of a route, an exit grid 1232 and an entrance grid 1231 have the same size; that is, the stock container 202 may also be rotated for direction changeover in the exit grid 1232 such that the rotated stock container 202 recovers the original orientation. That is, in this embodiment, the lengths of the two-dimensional grids 123 in the first direction in each sorting passage 121 are same, but the widths of the exit grid 1232 and the entrance grid 1231 in the second direction are greater than that of other two-dimension grids 123 in the sorting passage 121, so as to provide space for the stock container 202 to rotate for direction changeover, and also to improve the space utilization of the sorting zone 10.

This embodiment further provides a sorting method, which can implement double-sided sorting of a stock container. The sorting method provided in this embodiment is as follows.

Step S2010: an order management center receives a pick-up order, analyzes the position of a target stock container 202 corresponding to order goods in the pick-up order in a stock container zone 20, and at the same time plans a target sorting station 1 corresponding to the pick-up order.

Step S2020: the order management center dispatches a sorting robot 40, and plans a first traveling route for the sorting robot 40 according to an initial position of the sorting robot 40 and the position of the target stock container 202.

Step S2030: the sorting robot 40 travels to the bottom of the target stock container 202 according to the first traveling route.

Step S2040: a lifting mechanism 401 of the sorting robot 40 operates to cause a pallet to rise and come into contact with the bottom of the stock container 202 until the stock container 202 comes out of contact with the ground.

Step S2050: a control system determines a target sorting passage 121 that the sorting robot 40 needs to enter according to the congestion of sorting robots 40 in two sorting passages 121 in the target sorting station 1.

Step S2060: the control system plans a second traveling route for the sorting robot 40 according to the position of an entrance grid of the target sorting passage 121 and the position of the target stock container 202.

Step S2070: the sorting robot 40 travels to the entrance grid 1231 of the target sorting passage 121 according to the second traveling route, where during this process, the target stock container 202 does not perform direction changeover movement, and the sorting robot 40 can perform forward movement, backward movement, self-rotation for direction changeover, or the like.

Step S2080: the control system determines whether to perform sorting on two sides or one side of the target stock container 202 according to order information, and if sorting is to be performed on one side of the target stock container 202 and a sorting face 2021 faces away from the sorting point 122, executes step S2090, and if sorting is to be performed on one side of the target stock container 202 and a sorting face 2021 faces the sorting point 122, executes step S2110.

Step S2090: the pallet of the sorting robot 40 rotates to cause the target stock container 202 to rotate 180°, and then execute step S2100.

Step S2100: the sorting robot 40 moves forward along a second direction according to an entrance passage to a tail end of the entrance passage 1211, self-rotating 90° and traveling along a direction changeover passage 1213 to the sorting point 122.

Step S2110: a sorting operator sorts target goods on the target stock container 202.

Step S2120: after the sorting is completed, the sorting robot 40 self-rotates 90° for direction changeover and travels along an exit passage 1212 to an exit grid 1232 while carrying the stock container 202.

Step S2130: the control system plans a third traveling route according to the position of the exit grid 1232 and the position of the target stock container 202 in the stock container zone 20, and the sorting robot 40 transports the stock container 202 back to the stock container zone 20 according to the third traveling route.

Step S2140: the lifting mechanism 401 of the sorting robot 40 operates to cause the pallet to descend until the target stock container 202 comes into contact with the ground and the pallet comes out of contact with the bottom of the target stock container 202.

Step S2150: a driving mechanism 402 of the sorting robot 40 operates such that the sorting robot 40 moves out of the bottom of the stock container 202 and becomes separated from the target stock container 202.

In this embodiment, for a stock container 202 to be sorted on one side, if the stock container 202 has been rotated for direction changeover at the entrance grid 1231, the stock container 202 may be rotated for direction changeover at the exit grid 1232 such that the orientation of the stock container 202 is restored to the original position, or direction changeover may alternatively be not performed, and in this case, the orientation of the stock container 202 needs to be updated in the control system.

For a stock container 202 to be sorted on two sides, in this embodiment, after sorting is carried out once, it enters the exit grid 1232 and is rotated for direction changeover, and then sorting is performed on the other sorting face 2021. In other embodiments, it is also possible that after sorting is carried out once, it enters the entrance grid 1231 in the sorting passage 121 again, and then is rotated for direction changeover.

In this embodiment, providing the rotation zone is beneficial to implementing the double-sided sorting work of the stock container 202, reducing space occupation of a separate rotation zone, and improving structural compactness and the space utilization of the sorting zone.

This embodiment further provides a warehouse logistics system, which includes the above-mentioned stock sorting system.

Figure 18:
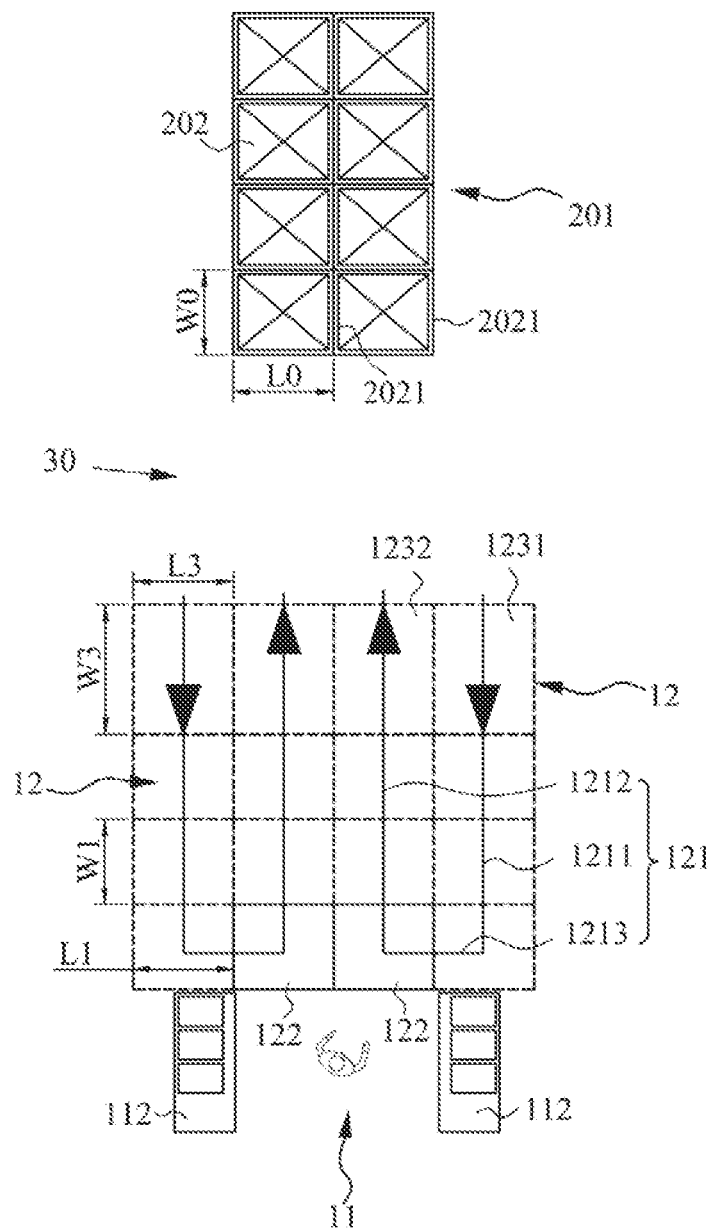
FIG. 18 is a schematic structural diagram of a sorting station and a stock container provided in an embodiment of the present application.

FIG. 18 is a schematic structural diagram of a stock sorting system provided in an embodiment of the present application. As shown in FIG. 18, this embodiment provides a stock sorting system, which is mainly used to implement "goods-to-person" sorting of order goods, and may also achieve conventional warehousing and logistics operations such as goods loading and stock check. In this embodiment, the stock sorting system includes a stock container zone 20, a common passage 30, a sorting zone 10, and sorting robots 40, where the arrangements of the stock container zone 20, the common passage 30, the sorting zone 10, and the sorting robots 40 are substantially same as in Embodiment II, with the only difference in the configuration of the stock container 202 in the stock container zone 20 and the configuration of the two-dimensional grid 123. Same structures as in Embodiment I will not be repeated in this embodiment.

In this embodiment, when the stock container 202 is in the stock container zone 20, a sorting face 2021 of the stock container 202 faces a longitudinal passage 203 or faces away from the longitudinal passage 201. In this case, as the sorting face 2021 of the stock container 202 does not face the sorting zone 10, no matter which sorting face 2021 the target goods are located in, the stock container 202 needs to be rotated such that the sorting face 2021 faces the sorting work zone 11. Furthermore, if double-sided sorting of the stock container 202 is required, after sorting is performed on one side, the stock container 202 needs direction changeover, and then sorting is carried out on the other side of the stock container 202.

In this embodiment, when the stock container 202 is stored in the stock container zone 20, the length of the stock container 202 in the first direction is $L_0$, and the width of the stock container 202 in the second direction is $W_0$. To ensure that normal movement of the sorting robot 40 carrying the stock container 202 in the stock container zone 20, the width $L_2$ of the transverse passage 204 is greater than $L_0$, and the width $W_2$ of the longitudinal passage 203 is greater than $W_0$. To ensure rotation of the stock container 202 in the rotation zone, the length $L_3$ of the two-dimensional grid 123 corresponding to the rotation zone in the first direction is greater than $W_0$, and its width $W_3$ in the second direction is greater than $\sqrt{W_0^2 + L_0^2}$. The length $L_1$ of a two-dimensional grid 123 except for the rotation zone in each sorting passage 121 in the first direction is greater than $W_0$, and its width $W_1$ in the second direction is greater than $L_0$, and to improve the space utilization, $W_1$ is slightly larger than $L_0$, and $L_1$ is slightly larger than $W_0$.

This embodiment further provides a sorting method, which is applied to the above-mentioned stock sorting system. The sorting method provided in this embodiment includes the following steps.

Step S3010: an order management center receives a pick-up order, analyzes the position of a target stock container 202 corresponding to order goods in the pick-up order in a stock container zone 20, and at the same time plans a target sorting station 1 corresponding to the pick-up order.

Step S3020: the order management center dispatches a sorting robot 10, and plans a first traveling route for the sorting robot 40 according to an initial position of the sorting robot 40 and the position of the target stock container 202.

Step S3030: the sorting robot 40 travels to the bottom of the target stock container 202 according to the first traveling route.

Step S3010: a lifting mechanism 401 of the sorting robot 40 operates to cause a pallet to rise and come into contact with the bottom of the stock container 202 until the target stock container 202 comes out of contact with the ground.

Step S3050: a control system determines a target sorting passage 121 that the sorting robot 40 needs to enter according to the congestion of sorting robots 40 in two sorting passages 121 in the target sorting station 1.

Step S3060: the control system planning a second traveling route for the sorting robot 40 according to the position of an entrance grid of the target sorting passage 121 and the position of the target stock container 202.

Step S3070: the sorting robot 40 travels to the entrance grid 1232 of the target sorting passage 121 according to the second traveling route, where during this process, the stock container 202 does not perform direction changeover movement, and the sorting robot 40 can perform forward movement, backward movement, self-rotation for direction changeover, or the like.

Step S3080: the control system determines a rotation angle of the stock container 202 according to a relationship between the initial orientation of a sorting face 2021 corresponding to target goods on the target stock container 202 and a work face of a sorting point 122.

Step S3090: the pallet of the sorting robot 40 rotates to cause the stock container 202 to rotate a preset angle.

In this embodiment, the sorting robot 40 causes the stock container 202 to change direction at the entrance grid 1231 such that the sorting face 2021 is consistent with the work face of the sorting point 122. In other embodiments, it is also possible that when the sorting robot 40 transports the stock container 202 to the common passage 30, the stock container 202 caused to change direction such that one sorting face 2021 of the stock container 202 is consistent with the work face of the sorting point 122. That is, in this embodiment, the first rotation for direction changeover that results in consistency of one sorting faces 2021 of the stock container 202 with the work face of the sorting point 122 may occur in the common passage 30, or may alternatively occur in the entrance grid 1231 of the sorting passage 121.

Step S3100: the sorting robot 40 moves forward along a second direction according to an entrance passage to a tail end of the entrance passage, self-rotates 90° and travels along a direction changeover passage 1213 to the sorting point 122.

Step S3110: a sorting operator sorting the target goods on the target stock container 202.

Step S3120: after the sorting is completed, the sorting robot 40 self-rotates 90° for direction changeover and travels along an exit passage 1212 to an exit grid 1232 while carrying the stock container 202.

Step S3130: the control system determines whether the target stock container 202 is to be sorted on two sides, and if the target stock container 202 is to be sorted on two sides, executes step S3140, and if the target stock container 202 is not to be sorted on two sides, executes step S3160.

Step S3140: the pallet of the sorting robot 40 rotates to cause the target stock container 202 to rotate 180°.

Step S3150: the control system determines a target sorting passage 121 that the sorting robot 40 needs to enter again according to the congestion of sorting robots 40 in the two sorting passages 121 in the target sorting station 1, and the sorting robot enters the entrance grid 1231 of the target sorting passage 121 from the exit grid 1232 where it is located, passes the entrance passage 1212 and enters the sorting point 122 for sorting, and after the sorting is completed, the sorting robot passes the exit passage 1212 and moves into the exit grid 1232 of the target sorting passage 121.

Step S3160: the pallet of the sorting robot 40 rotates to cause the stock container 202 to rotate a preset angle such that the stock container 202 is restored to the original orientation.

In this embodiment, the stock container 202 is restored to the original orientation at the exit grid 1232 of the sorting passage 121. In other embodiments, it is also possible that the sorting robot 40 carrying the stock container 202 moves out of the sorting station 1 and enters the common passage 30, and then causes the stock container 202 to rotate to the initial orientation.

Step S3170: the control system plans a third traveling route according to the position of the exit grid 1232 and the position of the target stock container 202 in the stock container zone 20, and the sorting robot 40 transports the stock container 202 back to the stock container zone 20 according to the third traveling route.

Step S3180: the lifting mechanism 401 of the sorting robot 40 operates to cause the pallet to descend until the target stock container 202 comes into contact with the ground and the pallet comes out of contact with the bottom of the stock container 202.

Step S3190: a driving mechanism 402 of the sorting robot 40 operates such that the sorting robot 40 moves out of the bottom of the stock container 202 and becomes separated from the target stock container 202.

For a stock container 202 to be sorted on two sides, in this embodiment, after sorting is carried out once, it enters the exit grid 1232 and is rotated for direction changeover, and then sorting is performed on the other sorting face 2021 in other embodiments, it is also possible that after sorting is carried out once, it enters the entrance grid in the sorting passage 121 again, and then is rotated for direction changeover.

In this embodiment, providing the rotation zone is beneficial to implementing the double-sided sorting work of the stock container 202, reducing space occupation of a separate rotation zone, and improving structural compactness and the space utilization of the sorting zone.

This embodiment further provides a warehousing and logistics system, which includes the above-mentioned stock sorting system.

Figure 19:
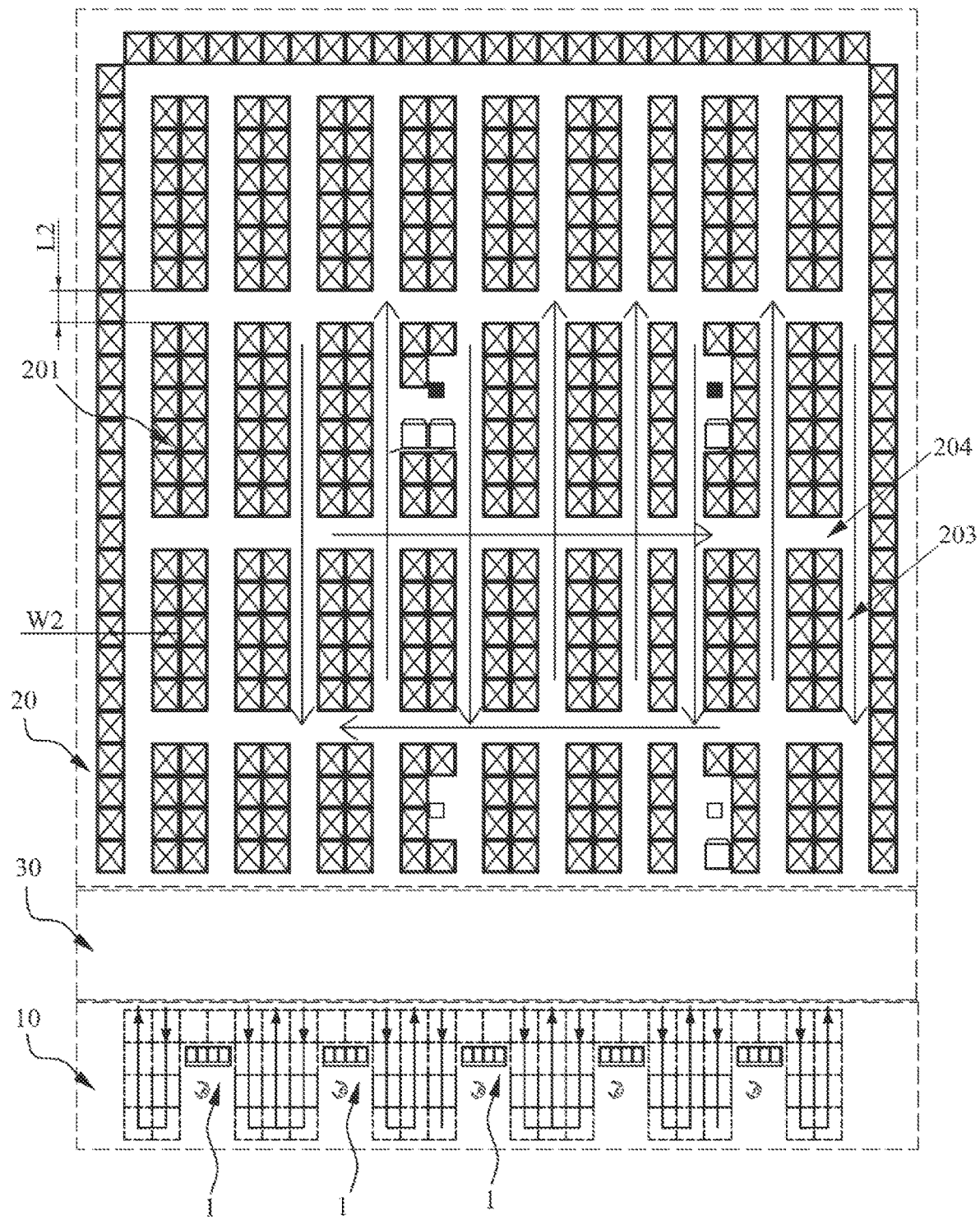
FIG. 19 is a schematic structural diagram of a stock sorting system provided in an embodiment of the present application.
Figure 20:
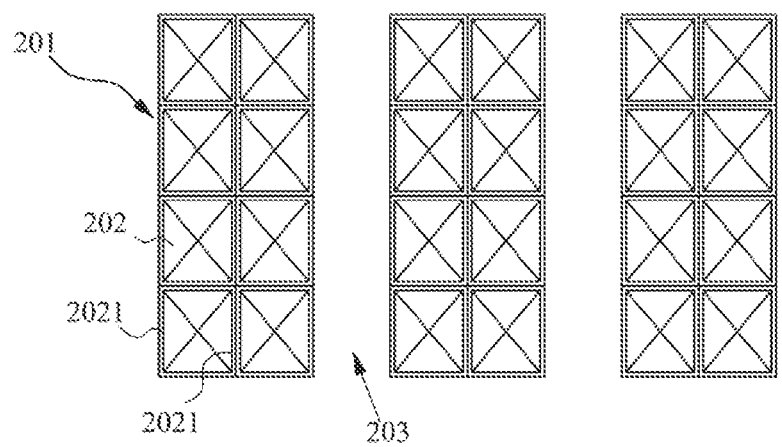
FIG. 20 is a schematic structural diagram of a sorting station and a stock container in FIG. 19.
Figure 20:
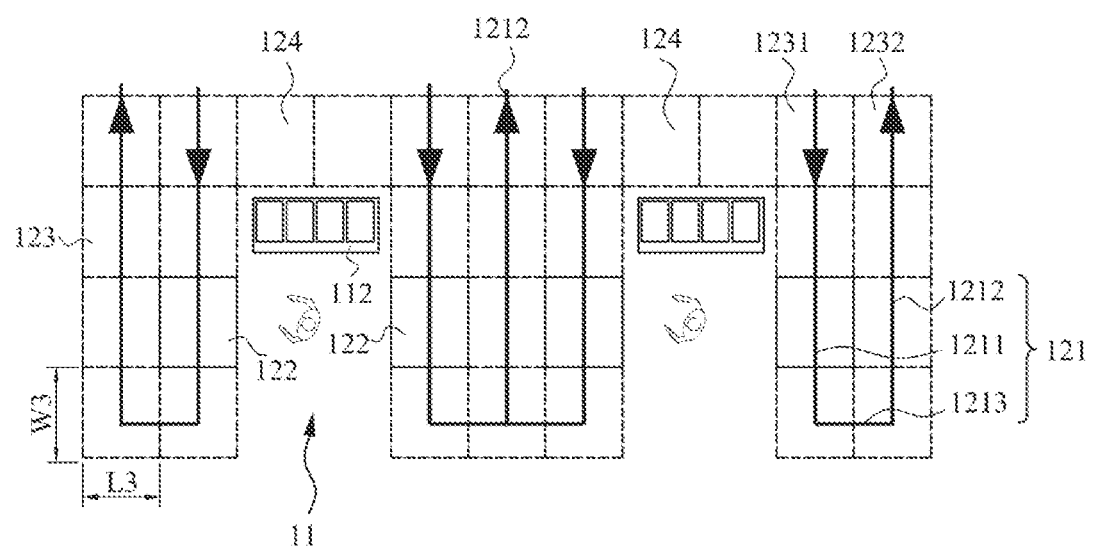

FIG. 19 is a schematic structural diagram of a stock sorting system provided in an embodiment of the present application, and FIG. 20 is a schematic structural diagram of a sorting station and a stock container provided in an embodiment of the present application. As shown in FIGS. 19 and 20, this embodiment provides a stock sorting system, which is mainly used to implement "goods-to-person" sorting of order goods, and may also achieve conventional warehousing and logistics operations such as goods loading and stock check. In this embodiment, the stock sorting system includes a stock container zone 20, a common passage 30, a sorting zone 10, and sorting robots 40, where the arrangements of the stock container zone 20, the common passage 30, the sorting zone 10, and the sorting robots 40 are substantially same as in the Embodiment I, with the only difference in the configuration of the sorting zone 10. Same structures as in the Embodiment I will not be repeated in this embodiment.

In this embodiment, the stock container 202 has two sorting faces 2021 opposite to each other, where one of the two sorting faces 2021 faces a longitudinal passage 203, and the other faces away from the longitudinal passage 203 adjacent thereto. Each partition layer 2022 of the stock container 202 can be provided with one or a plurality of storage containers 50 side by side along the second direction.

In this embodiment, each sorting station 1 includes two sorting points 122 and two sorting passages 121, where each sorting passage 122 forms a U shape, and both an entrance and an exit of the sorting passage 122 face the stock container zone 20. The two sorting passages are spaced apart from each other, and a sorting work zone 11 for a sorting operator to move is formed between the two sorting passages. The sorting point 122 is located on a side of the U shape of the sorting passage 121, and the sorting point 122 faces the sorting work zone 11.

In this configuration, as the sorting point 122 is located on a side of the sorting work zone 11, when the sorting robot 40 transports the stock container 202 from the stock container zone 20 to the sorting point 122, rotation of the stock container 202 may be not needed to enable a sorting face 2021 of the stock container 202 to face the sorting work zone 11, thus improving the sorting efficiency and avoiding an increase in space caused by providing an additional rotation zone. Furthermore, the sorting points 122 and the sorting passages 121 are provided on two sides of the sorting work zone 11, so that the same sorting operator can be responsible for the sorting on the two sorting points 122, and after the sorting of a stock container 202 on one sorting point 122 is completed and the sorting robot entered from the sorting passage 121 has not conveyed a stock container 202 to the sorting point 122, the sorting operator can perform sorting on a stock container 202 waiting for sorting on the other sorting point 122, thereby reducing the idle waiting time of the sorting operator, and improving the sorting efficiency.

In an embodiment, in the two sorting passages 121, one sorting passage 121 is arranged clockwise, and the other sorting passage 121 is arranged counterclockwise. That is, both entrance passages 1211 of the two sorting passages 121 are located on a side of the sorting passage 121 adjacent to the sorting work zone 11, or both exit passages 1212 of the two sorting passages 121 are located on a side of the sorting passage 121 adjacent to the sorting work zone 11. In this configuration, if the sorting robot 40 transports the stock container 202 to the sorting points 122 of different sorting passages 121, the sorting face 2021 facing the sorting work zone 11 is different in each case. That is, according to the orientation of the sorting face 2021 corresponding to the target goods on the stock container 202, one of the two sorting passages 121 can be selected to enter the sorting station 1, so that when the stock container 202 is located at the sorting point 122, the sorting face 2021 where the target goods is located faces directly toward the sorting work zone 11, to facilitate sorting by the sorting person. This is beneficial for sorting of a stock container 202 to be sorted on both sides, avoiding rotation for direction changeover of the stock container 202 during the process of transporting by the sorting robot 40, and improving the sorting efficiency.

In this embodiment, on a side of the sorting work zone 11 facing the stock container zone 20, the sorting station 1 is provided with a communication passage 124 that communicates the two sorting passages 121, and the communication passage 124 is formed by two logically divided two-dimensional grids, and the two two-dimensional grids of the communication passage and the entrance grids 1231 and the exit grids 1232 are arranged side by side to achieve communication between the two sorting passages 121, so that the sorting robot 40 does not need to move out of the sorting station 1 to achieve movement between the two sorting passages 122 in the same sorting station, thereby implementing the double-sided sorting operation of the stock container 202.

In an embodiment, each of the entrance passages 1211 of the two sorting passages 121 is located on a side of the sorting passage 121 adjacent to the sorting work zone 11, and two adjacent sorting passages 121 of two adjacent sorting stations 1 share one exit passage 1212. This configuration can improve the compactness of the arrangement of the sorting stations 1 in the sorting zone 10 and save space.

In an embodiment, each column of two-dimensional grid group includes four two-dimensional grids 123 to improve the space utilization of the sorting zone 10 and the space compactness of the stock sorting system. In an embodiment, the third two-dimensional grid 123 along the direction of the entrance passage 1211 forms the sorting point 122. In this configuration, on the one hand, the first two two-dimensional grids 123 can be used for the sorting robot 40 to enter the sorting passage 121 and wait in the sorting passage 121, thereby increasing the number of sorting robots 40 that may wait in the sorting passage 121 on the other hand, this facilitates providing put walls 112 on two sides of the sorting point 122 along the second direction, so that the sorting operator can quickly take the target goods on the stock container 202 in the sorting work and put the goods into an order box of the put wall 112. In another embodiment, the sorting point 122 may also be formed by a two-dimensional grid 123 at the tail end of the entrance passage 1211 away from the entrance grid 1231.

The length of the stock container 202 in the first direction is $L_0$, and the width of the stock container 202 in the second direction is $W_0$. To ensure the transporting of the stock container 202 in the stock container zone 20, the width $L_2$ of the transverse passage 204 is greater than $L_0$, and the width $W_2$ of the longitudinal passage 203 is greater than $W_0$. To ensure the traveling of the stock container 202 in the sorting zone 10 and avoid collision during the traveling of the sorting robot 40, the length $L_1$ of each two-dimensional grid 123 along the first direction is greater than $L_0$, and the width $W_1$ of each two-dimensional grid 123 in the second direction is greater than $W_0$. Furthermore, to improve the space utilization, $W_1$ is slightly larger than $W_0$, and $L_1$ is slightly larger than $L_0$.

In an embodiment, to improve the planning consistency of the sorting zone 10, each two-dimensional grid 123 is identical.

In an embodiment, one put wall 112 is provided in the sorting work zone 11, and the put wall 112 is located between two sorting points 122, and the put wall 112 is oriented away from the stock container zone 20. In other implementations, the sorting work zone 11 may be provided with two put walls 112, and the two put walls 112 are arranged oppositely, and are respectively located on two sides of the sorting point 122 along the second direction.

In this embodiment, as a sorting face 2021 of the stock container 202 in the stock container zone 20 faces toward or away from the longitudinal passage 203, the initial orientation of the sorting face 2021 of the stock container 202 in the stock container zone 20 is same as the orientation of the work face of the sorting point 122. That is, during the process of transporting the stock container 202 by the sorting robot 40, the stock container 202 does not need to change direction. In other embodiments, the placement position of the stock container 202 in the stock container zone 20 may be not limited, and before the sorting robot 40 transports the stock container 202 to the sorting station 1, it can cause the stock container 202 to be rotated for direction changeover such that the sorting face 2021 of the stock container 202 is oriented same as the work face of the sorting point 122.

This embodiment further provides a sorting method, which is applied to the above-mentioned stock sorting system, and can implement sorting on two sides of the stock container 202. The sorting method includes the following steps.

Step S4010: Tan order management center receives a sort-up order, analyzes the position of a target stock container 202 corresponding to order goods in the pick-up order in a stock container zone 20, and at the same time plans a target sorting station 1 corresponding to the pick-up order.

Step S4020: the order management center dispatches a sorting robot 40, and plans a first traveling route for the sorting robot 40 according to an initial position of the sorting robot 40 and the position of the target stock container 202.

Step S4030: the sorting robot 40 travels to the bottom of the target stock container 202 according to the first traveling route.

Step S4040: a lifting mechanism 401 of the sorting robot 40 operates to cause a pallet to rise and come into contact with the bottom of the stock container 202 until the target stock container 202 comes out of contact with the ground.

Step S4050: the control system determines whether the target stock container 202 is to be sorted on two sides, and if the target stock container 202 is to be sorted on two sides, determines a target sorting passage 121 to enter according to the congestion in the two sorting passages 121 in the target sorting station 1, and if the target stock container 202 is not to be sorted on two sides, determines a target sorting passage 121 to enter according to the orientation of a sorting face 2021 of the target stock container 202.

Step S4060: the control system plans a second traveling route for the sorting robot 40 according to the position of an entrance grid of the target sorting passage 121 and the position of the target stock container 202.

Step S4070: the sorting robot 40 travels to the entrance grid of the target sorting passage 121 according to the second traveling route, where during this process, the target stock container 202 does not perform direction changeover movement, and the sorting robot 40 can perform forward movement, backward movement, self-rotation for direction changeover, or the like.

In this embodiment, the initial orientation of the stock container 202 in the stock container zone 20 is consistent with the orientation of the work face of one of the sorting points 122, so the stock container 202 does not need to change direction. In other embodiments, if the initial orientation of the stock container 202 in the stock container zone 20 is different from the orientation of the work face of any of the two sorting points 122, the sorting robot 40 can rotate the stock container 202 for direction changeover before carrying the stock container 202 into the sorting station 1, such that the sorting face 2021 of the stock container 202 is oriented the same as the work face of one of the sorting points 122.

Step S4080: the sorting robot 40 moves forward along a second direction according to an entrance passage to the sorting point 122.

Step S4090: a sorting operator sorts the target goods on the target stock container 202.

Step S4100: after the sorting is completed, the sorting robot 40 travels along a direction changeover passage 1213 and an exit passage 1212 to an exit grid 1232.

Step S4110: the control system determines whether the stock container 202 is to be sorted on two sides, and if the target stock container 202 is to be sorted on two sides, executes step S4120, and if the target stock container 202 is not to be sorted on two sides, executes step S4130.

Step S4120: the sorting robot 40 enters the other sorting passage 121 through a communication passage 124, and travels to the corresponding sorting point 122 while carrying the target stock container 202 to be sorted by the sorting operator, and after the sorting is completed, passes the exit passage 1212 and moves into the exit grid 1232 of the target sorting passage 121.

Step S4130: the control system plans a third traveling route according to the position of the exit grid 1232 and the position of the target stock container 202 in the stock container zone 20, and the sorting robot 40 transports the target stock container 202 back to the stock container zone 20 according to the third traveling route.

Step S4140: the lifting mechanism 401 of the sorting robot 40 operates to cause the pallet to descend until the target stock container 202 comes into contact with the ground and the pallet comes out of contact with the bottom of the target stock container 202.

Step S4150: a driving mechanism 402 of the sorting robot 40 operates such that the sorting robot 40 moves out of the bottom of the target stock container 202 and becomes separated from the stock container 202.

This embodiment further provides a warehousing and logistics system, which includes the above-mentioned stock sorting system.

What is claimed is:

1. A shelf management system, comprising:
a mobile robot, configured to transport a shelf;
the shelf, configured to be provided with locations for placing commodities and be transportable by the mobile robot;
a shelf zone, configured to store the shelf;
a plurality of stations and a station queuing zone of each of the plurality of stations, wherein the station is a worker operation position; and the station queuing zone is an area set near the worker operation position, where the mobile robot transporting the shelf queues and waits for a worker's operation; and
characterized in that a server, communicatively connected with the mobile robot and configured to:
estimate whether there is a free space in a station queuing zone of a first station;
select, in response to estimating that there is a free space in the station queuing zone of the first station, a shelf from shelves that are allocated to the first station and not transported, and control a mobile robot to transport the selected shelf;
after the mobile robot is butt-jointed with the selected shelf, re-estimate whether there is a free space in any of station queuing zones of all stations needing the selected shelf, wherein the all stations needing the selected shelf comprises the first station;
in response to estimating that there is a free space in any of the station queuing zones of all the stations, control the mobile robot to transport the selected shelf to the station queuing zone estimated to have a free space, and determine, in a case where the mobile robot transports the selected shelf and arrives at a preset area around the station queuing zone estimated to have a free space, whether there is a free space vacated in the station queuing zone estimated to have a free space; and
control, in response to determining that there is a free space vacated in the station queuing zone estimated to have a free space, the mobile robot to enter the station queuing zone estimated to have a free space.

2. The system according to claim 1, wherein a layout mode of the station queuing zone comprises one of:

a dual-station symmetrical layout mode, a parallel layout mode, or a mode of queuing with no specific rotation zone.

3. The system according to claim 2, wherein in a case where the layout mode of the station queuing zone comprises the dual-station symmetrical layout mode, the station queuing zone comprises two rotation zones and two queuing passages around the two rotation zones respectively, the two queuing passages being partially overlapped to form a passage area between the two rotation zones, each queuing passage being provided with an entrance position, an operation position, a plurality of rotation zone entry positions, a plurality of queuing return positions, and an exit position, wherein the operation position is a position where the mobile robot transporting the shelf waits for the worker's operation; the rotation zone entry position is a position allowing the mobile robot to enter the rotation zone from the queuing passage; the queuing return position is a position allowing the mobile robot to enter the queuing passage from the rotation zone; the entrance position is set in the passage area, the two queuing passages sharing one entrance position; and the rotation zone entry positions, the queuing return positions and the exit positions on the two queuing passages are symmetrically arranged on two sides of the passage area.

4. The system according to claim 2, wherein in a case where the layout mode of the station queuing zone comprises the parallel layout mode, the station queuing zone comprises two rotation zones and two queuing passages around the two rotation zones respectively, each queuing passage being provided with an entrance position, an operation position, a plurality of rotation zone entry positions, a plurality of queuing return positions, and an exit position, the two queuing passages being arranged in parallel, wherein the operation position is a position where the mobile robot transporting the shelf waits for the worker's operation; the rotation zone entry position is a position allowing the mobile robot to enter the rotation zone from the queuing passage; and the queuing return position is a position allowing the mobile robot to enter the queuing passage from the rotation zone.

5. The system according to claim 2, wherein in a case where the layout mode of the station queuing zone comprises a mode of queuing with no specific rotation zone, the station queuing zone comprises a queuing passage, and the queuing passage is used as a rotation zone, the queuing passage being provided with an operation position, an exit position, and a plurality of entrance positions, the plurality of entrance positions being located between the operation position and the exit position.

6. The system according to claim 3, wherein
a plurality of directions are set for the exit position, and in a case where the mobile robot needs to perform shelf rotation again after the operation is completed, the mobile robot is allowed to enter the station queuing zone again from the exit position, or leave the station queuing zone from the exit position and return to the station queuing zone via an external route.

7. The system according to claim 1, wherein in a case where a layout mode of the station queuing zone comprises a multi-operation point layout mode, the station queuing zone comprises a plurality of operation positions, the plurality of operation positions being arranged in a line, and each operation position being used as an entrance position and an exit position, and the operation position being a position where the mobile robot transporting the shelf waits for the worker's operation.

8. The system according to claim 2, wherein
a jacking mechanism and a trolley body move independently to achieve that the trolley body does not move, while the jacking mechanism performs descending and jacking operations; the trolley body does not move, while the jacking mechanism rotates; the trolley body and the jacking mechanism are locked up and rotate at a same speed; or the trolley body and the jacking mechanism rotate at different speeds at the same time.

9. The system according to claim 1, wherein the server is further configured to:
in response to estimating that there is no free space in any of the station queuing zones of all the stations, control the mobile robot to queue and wait in situ.

10. The system according to claim 1, wherein the server is further configured to:
in response to there being no free space vacated in the station queuing zone estimated to have a free space, control the mobile robot to queue and wait at a position, with a quantity of mobile robots less than a set quantity within a set range around the mobile robot, that does not obstruct routes of other mobile robots, or control the mobile robot to transport the selected shelf to another station needing the selected shelf.

11. The system according to claim 1, wherein the server is further configured to:
after controlling the mobile robot to enter the station queuing zone estimated to have a free space, determine in real time whether there is a free space vacated ahead of the mobile robot, and in response to determining that there is a free space vacated ahead of the mobile robot, control the mobile robot to move toward the free space ahead, or in response to there being no free space vacated ahead of the mobile robot, control the mobile robot to queue and wait in situ.

12. The system according to claim 1, wherein the server is further configured to:
in response to a number of mobile robots that are currently transporting shelves for a station being smaller than a size of a station queuing zone of the station, determine that the station queuing zone of the station has a free space; or
in response to a number of mobile robots that are currently transporting shelves for a station being greater than or equal to a size of a station queuing zone of the station, calculate time for vacating a free space in the station queuing zone of the station, and in response to the time being less than time for a newly allocated mobile robot to arrive at the station queuing zone of the station, determine that the station queuing zone of the station has a free space.

13. The system according to claim 1, wherein the server is further configured to:
in response to detecting the surrounding environment of the selected shelf meeting the rotation condition, control the mobile robot to rotate the selected shelf in at least one of following three manners:
performing rotation in a transporting route, performing rotation in a rotation zone of the station corresponding to the station queuing zone estimated to have a free space, or performing rotation in situ at an operation position of the station queuing zone estimated to have a free space.

14. The system according to claim 13, wherein the server is further configured to:
within the traveling route of the mobile robot transporting the selected shelf, control the mobile robot to detect whether a cell within a preset range around a route point ahead is occupied, and in response to the cell within the preset range around the route point ahead being applied for successfully, use the route point ahead as a rotation point; and in a case where the mobile robot arrives at the set rotation point, occupy the cell within the preset range around the route point ahead as the rotation zone, and in response to the cell within the preset range around the route point ahead being not occupied successfully, control the mobile robot to continue walking.

15. The system according to claim 13, wherein the server is further configured to:

before the mobile robot arrives at the operation position of the station queuing zone estimated to have a free space, if the mobile robot does not rotate the selected shelf in the traveling route for transporting the selected shelf, control the mobile robot to enter the rotation zone of the station corresponding to the station queuing zone estimated to have a free space to rotate the selected shelf.

16. The system according to claim 15, wherein the server is further configured to:

in a case where the selected shelf that has been rotated still needs to be rotated, determine whether a cell within a preset range around the mobile robot in-situ being possible to be occupied, and in response to the cell within the preset range around the mobile robot in-situ being possible to be occupied, occupy the corresponding cell as the rotation zone, and in response to the cell within the preset range around the mobile robot in-situ being not possible to be occupied, control the mobile robot to enter the station queuing zone estimated to have a free space again and continue to queue and enter the rotation zone of the corresponding station.

17. The system according to claim 13, wherein the mobile robot rotates the selected shelf by using a straightline and polyline path.

* * * * *